United States Patent
Fujishiro et al.

(10) Patent No.: US 9,866,342 B2
(45) Date of Patent: Jan. 9, 2018

(54) MOBILE COMMUNICATION SYSTEM, COMMUNICATION CONTROL METHOD, BASE STATION, USER TERMINAL AND PROCESSOR

(71) Applicant: KYOCERA CORPORATION, Kyoto (JP)

(72) Inventors: Masato Fujishiro, Yokohama (JP); Chiharu Yamazaki, Ota-ku (JP)

(73) Assignee: KYOCERA Corporation, Kyoto (JP)

(*) Notice: Subject to any disclaimer, the term of this patent is extended or adjusted under 35 U.S.C. 154(b) by 231 days.

(21) Appl. No.: 14/654,051

(22) PCT Filed: Dec. 19, 2013

(86) PCT No.: PCT/JP2013/084095
§ 371 (c)(1),
(2) Date: Jun. 19, 2015

(87) PCT Pub. No.: WO2014/098187
PCT Pub. Date: Jun. 26, 2014

(65) Prior Publication Data
US 2015/0358099 A1    Dec. 10, 2015

Related U.S. Application Data

(60) Provisional application No. 61/740,989, filed on Dec. 21, 2012, provisional application No. 61/745,016, (Continued)

(51) Int. Cl.
*H04W 4/00* (2009.01)
*H04W 24/02* (2009.01)
(Continued)

(52) U.S. Cl.
CPC ............ *H04J 11/004* (2013.01); *H04B 7/024* (2013.01); *H04J 11/003* (2013.01); *H04L 5/005* (2013.01);
(Continued)

(58) Field of Classification Search
CPC ....... H04J 11/004; H04J 11/003; H04B 7/024; H04W 72/042; H04W 88/08; H04L 5/005; H04L 5/0073; H04L 25/03898
See application file for complete search history.

(56) References Cited

U.S. PATENT DOCUMENTS 8,135,349 B2 *    3/2012  Hwang ................ H04B 7/0452
                                                    375/267
2012/0250521 A1*  10/2012  Marinier ............ H04W 72/082
                                                    370/241

OTHER PUBLICATIONS

International Search Report, PCT/JP2013/084095, dated Feb. 10, 2014.
(Continued)

*Primary Examiner* — Kiet Tang
(74) *Attorney, Agent, or Firm* — Studebaker & Brackett PC

(57) ABSTRACT

A mobile communication system comprises: a user terminal that receives a desired wave signal from a serving cell and an interference wave signal that is a signal to another user terminal; and a first base station that manages the serving cell. The first base station includes: a control unit configured to generate configured to an interference replica signal corresponding to the interference wave signal and to superpose the interference replica signal on the desired wave signal; and a transmission unit configured to transmit the desired wave signal superposed with the interference replica signal to the user terminal. The control unit generates the interference replica signal such that the interference replica (Continued)

signal received by the user terminal cancels the interference wave signal received by the user terminal.

41 Claims, 22 Drawing Sheets

Related U.S. Application Data filed on Dec. 21, 2012, provisional application No. 61/745,043, filed on Dec. 21, 2012, provisional application No. 61/748,293, filed on Jan. 2, 2013.

(51) Int. Cl.
| | | |
|---|---|---|
| *H04B 7/02* | (2017.01) | |
| *H04J 11/00* | (2006.01) | |
| *H04B 7/024* | (2017.01) | |
| *H04W 72/04* | (2009.01) | |
| *H04L 5/00* | (2006.01) | |
| *H04W 88/08* | (2009.01) | |
| *H04L 25/03* | (2006.01) | |

(52) U.S. Cl.
CPC ......... *H04L 5/0073* (2013.01); *H04W 72/042* (2013.01); *H04L 25/03898* (2013.01); *H04W 88/08* (2013.01)

(56) References Cited

OTHER PUBLICATIONS

Written Opinion of the International Searching Authority, PCT/JP2013/084095, dated Feb. 10, 2014.
3rd Generation Partnership Project; Technical Specification Group Radio Access Network; Coordinated multi-point operation for LTE physical layer aspects (Release 11), 3GPP TR 36.819 v11.10 (Dec. 2011).

\* cited by examiner

MOBILE COMMUNICATION SYSTEM, COMMUNICATION CONTROL METHOD, BASE STATION, USER TERMINAL AND PROCESSOR

TECHNICAL FIELD

The present invention relates to a mobile communication system that supports CoMP, a communication control method therefor, a base station thereof, a user terminal thereof, and a processor thereof.

BACKGROUND ART

In 3GPP (3rd Generation Partnership Project) that is a project aiming to standardize a mobile communication system, after release 11, the standardization of CoMP (Coordinated Multi-Point) is scheduled to be performed (see non patent document 1). The CoMP represents a communication mode in which a transmission/reception point (a base station or a cell) in the same place is positioned as one "point" and a plurality of points communicate with a user terminal in coordination with one another.

As a downlink CoMP scheme, JT (Joint Transmission), DPS (Dynamic Point Selection), CS (Coordinated Scheduling), and CB (Coordinated Beamforming) are proposed.

The JT-CoMP represents a scheme in which a plurality of points simultaneously perform transmission to a user terminal by using the same radio resource. The DPS-CoMP and the CS-CoMP represent a scheme in which a plurality of points ensure the same radio resource and selectively perform transmission to a user terminal. The CB-CoMP represents a scheme in which a plurality of points perform beamforming and null steering of a transmission beam in coordination with one another.

PRIOR ART DOCUMENT

Non-Patent Document

Non Patent Document 1: 3GPP Technical Report "TR 36.819 V11.1.0" December, 2011

SUMMARY OF THE INVENTION

However, each of the aforementioned CoMP schemes has the following problems.

The JT-CoMP, the DPS-CoMP, and the CS-CoMP have a problem that the use efficiency of a radio resource is reduced because each point consumes a radio resource for one user terminal.

The CB-CoMP has a problem that although it is possible to suppress the reduction of the use efficiency of a radio resource, the cost (a device cost and an installation cost) of each point is high because each point needs to have a plurality of antennas.

Therefore, the present invention provides a mobile communication system, a communication control method, a base station, a user terminal and a processor, all of which is realizing a new CoMP scheme capable of solving the aforementioned problems.

A mobile communication system according to an embodiment comprises: a user terminal that receives a desired wave signal from a serving cell and an interference wave signal that is a signal to another user terminal; and a first base station that manages the serving cell. The first base station includes: a control unit configured to generate an interference replica signal corresponding to the interference wave signal and to superpose the interference replica signal on the desired wave signal; and a transmission unit configured to transmit the desired wave signal superposed with the interference replica signal to the user terminal. The control unit generates the interference replica signal such that the interference replica signal received by the user terminal cancels the interference wave signal received by the user terminal.

DESCRIPTION OF THE EMBODIMENT

Overview of Embodiment

Figure 1:
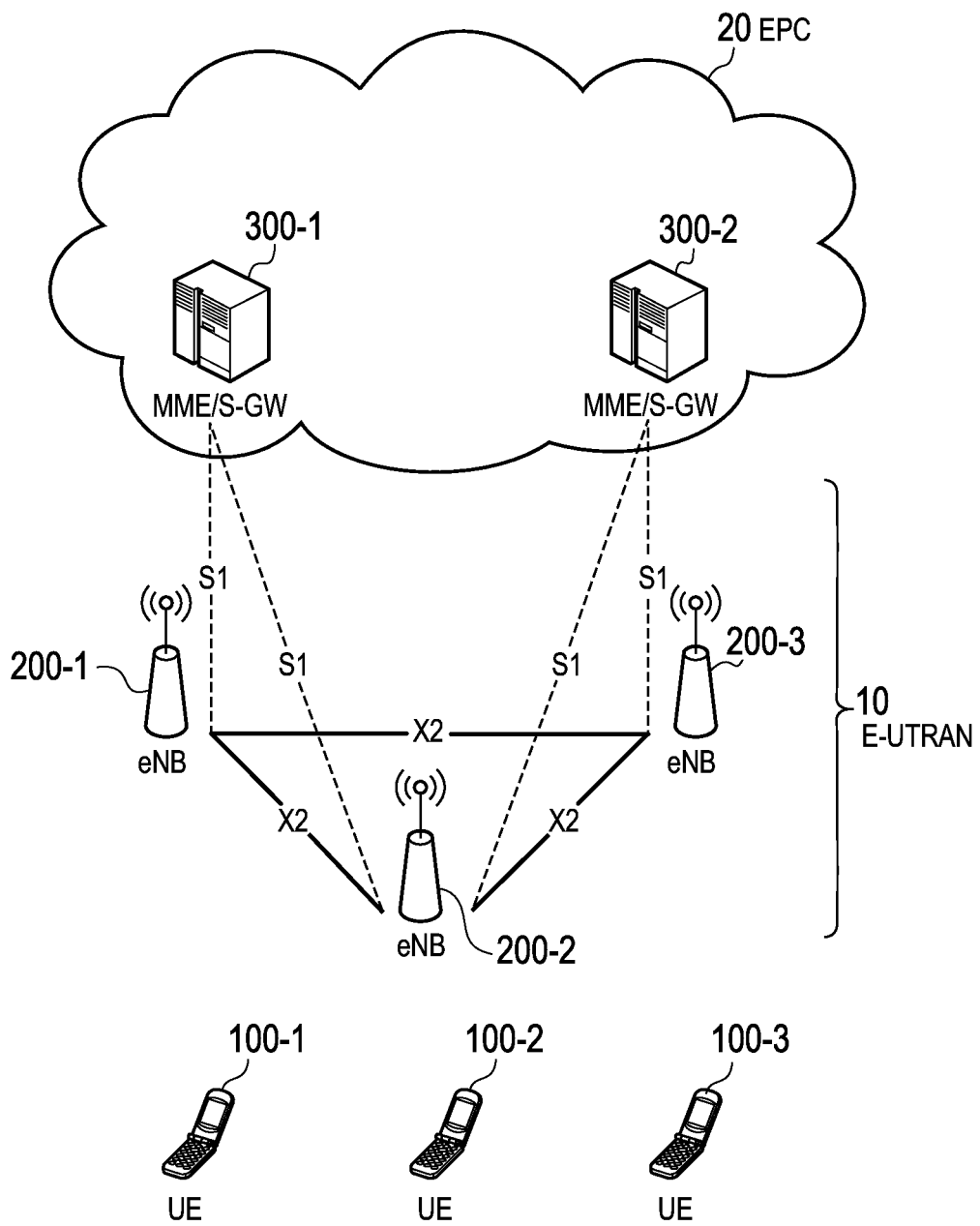
FIG. 1 is a configuration diagram of an LTE system according to a first embodiment and a second embodiment.

A mobile communication system according to an embodiment comprises: a user terminal that receives a desired wave signal from a serving cell and an interference wave signal that is a signal to another user terminal; and a first base station that manages the serving cell. The first base station includes: a control unit configured to generate an interference replica signal corresponding to the interference wave signal and to superpose the interference replica signal on the desired wave signal; and a transmission unit configured to transmit the desired wave signal superposed with the interference replica signal to the user terminal. The control unit generates the interference replica signal such that the interference replica signal received by the user terminal cancels the interference wave signal received by the user terminal.

According to such a scheme, it is possible to reduce received power of the interference wave signal in the user terminal, so that it is possible to improve desired wave-to-interference wave ratio, that is, SIR (Signal-to-Interference Ratio). Moreover, when the base station does not have a plurality of antennas, that is, even when beamforming/null steering is not possible, the present scheme is applicable.

In an embodiment, the another user terminal is connected to a neighbor cell adjacent to the serving cell, and the interference wave signal is a signal form the neighbor cell. Thus, since it is not necessary to ensure a radio resource for the user terminal, in the neighbor cell, it is possible to improve the use efficiency of a radio resource as compared with JT-CoMP, DPS-CoMP, and CS-CoMP.

In an embodiment, the first base station manages the serving cell to which the user terminal is connected and a neighbor cell to which the another user terminal is connected and which is adjacent to the serving cell, and the transmission unit transmits the interference wave signal to the another user terminal.

In an embodiment, the another user terminal is located in the serving cell to which the user terminal is connected, and the transmission unit transmits the interference wave signal to the another user terminal.

In an embodiment, the first base station manages each of communication with the user terminal and communication with the another user terminal, and the transmission unit transmits the interference wave signal to the another user terminal.

In an embodiment, the control unit generates the interference replica signal such that a phase of the interference replica signal received by the user terminal is opposite to a phase of the interference wave signal received by the user terminal.

In an embodiment, the control unit generates the interference replica signal such that an amplitude of the interference replica signal received by the user terminal is equal to an amplitude of the interference wave signal received by the user terminal.

In an embodiment, the first base station includes at least one antenna associated with the serving cell. The control unit determines whether or not to apply superposition transmission in which the interference replica signal is superposed on the desired wave signal, on the basis of the number of the antennas.

In an embodiment, the control unit determines whether or not to apply superposition transmission in which the interference replica signal is superposed on the desired wave signal, on the basis of a received signal state in the user terminal.

In an embodiment, the control unit determines whether or not to apply superposition transmission in which the interference replica signal is superposed on the desired wave signal, on the basis of a usage status of a radio resource in the mobile communication system.

In an embodiment, the control unit determines whether or not to apply superposition transmission in which the interference replica signal is superposed on the desired wave signal, on the basis of QoS required by the user terminal.

In an embodiment, the mobile communication system further comprises: a management device that manages the first base station and the second base station. The first base station includes a reception unit configured to receive information used for generating the interference replica signal from at least one of the management device, and the user terminal. The control unit generates the interference replica signal on the basis of the information received by the reception unit.

In an embodiment, the mobile communication system further comprises a second base station that manages the neighbor cell, wherein the management device manages the second base station, and the reception unit receives information used for generating the interference replica signal from at least one of the second base station, the management device, and the user terminal.

In an embodiment, the information used for generating the interference replica signal includes waveform information relating to a signal waveform of the interference wave signal. The second base station transmits the waveform information to the first base station. The reception unit receives the waveform information.

In an embodiment, the control unit transmits resource information indicating a radio resource used for transmitting the desired wave signal, to the second base station. The second base station transmits the waveform information to the first base station, on the basis of the resource information.

In an embodiment, the information used for generating the interference replica signal includes transmission data obtained before being converted into the interference wave signal in the second base station. The second base station transmits the transmission data to the first base station. The reception unit receives the transmission data from the second base station.

In an embodiment, the information used for generating the interference replica signal further includes transmission process information indicating a content of a transmission process used when the transmission data is converted into the interference wave signal in the second base station. The second base station further transmits the transmission process information to the first base station. The reception unit further receives the transmission process information from the second base station.

In an embodiment, the information used for generating the interference replica signal includes transmission data obtained before being converted into the interference wave signal in the second base station. The management device transmits the transmission data to the first base station. The reception unit receives the transmission data from the management device.

In an embodiment, the information used for generating the interference replica signal further includes transmission process information indicating a content of a transmission process used when the transmission data is converted into the interference wave signal in the second base station. The second base station transmits the transmission process information to the first base station. The reception unit receives the transmission process information from the second base station.

In an embodiment, the interference wave signal includes a data signal transmitted on a physical downlink shared channel. The information used for generating the interference replica signal is difference information indicating at least one of an amplitude difference and a phase difference between the data signal and a reference signal transmitted by the second base station. The second base station transmits the difference information to the first base station. The reception unit receives the difference information from the second base station.

In an embodiment, the information used for generating the interference replica signal is received power information indicating received power about a reference signal received by the user terminal from the second base station. The user terminal transmits the received power information to the second base station. The second base station transfers the received power information to the first base station. The reception unit receives the received power information from the second base station.

In an embodiment, the information used for generating the interference replica signal is received power information indicating received power about a reference signal received by the user terminal from the second base station. The user terminal transmits the received power information to the first base station. The reception unit receives the received power information from the user terminal.

In an embodiment, the interference wave signal includes a data signal transmitted on a physical downlink shared channel. The information used for generating the interference replica signal is power difference information indicating a power difference between the data signal and a reference signal transmitted by the second base station. The user terminal transmits the power difference information to the first base station. The reception unit receives the power difference information from the user terminal.

In an embodiment, the interference wave signal includes a data signal transmitted on a physical downlink shared channel. The information used for generating the interference replica signal is power difference information indicating a power difference between the data signal and a reference signal transmitted by the second base station. The second base station transmits the power difference information to the first base station. The reception unit receives the power difference information from the second base station.

In an embodiment, the information used for generating the interference replica signal is time difference information indicating a delay time difference between a delay time from the first base station to the user terminal and a delay time from the second base station to the user terminal. The user terminal transmits the time difference information to the first base station. The reception unit receives the time difference information from the user terminal.

In an embodiment, the information used for generating the interference replica signal is channel information indicating a channel characteristic between the second base station and the user terminal. The reception unit receives the channel information from at least one of the second base station and the user terminal. The control unit generates the interference replica signal on the basis of the channel information received by the reception unit.

In an embodiment, the user terminal generates the channel information on the basis of a reference signal received from the second base station and transmits the generated channel information to the first base station. The reception unit receives the channel information from the user terminal.

In an embodiment, the user terminal generates the channel information on the basis of a reference signal received from the second base station and transmits the generated channel information to the second base station. The second base station transfers, to the first base station, the channel information from the user terminal. The reception unit receives the channel information from the second base station.

In an embodiment, the first base station transmits, to the user terminal, cell designation information indicating a cell for which a channel characteristic should be estimated. The user terminal estimates the channel characteristic about the cell indicated by the cell designation information to thereby generate the channel information.

In an embodiment, the second base station generates the channel information on the basis of a reference signal received from the user terminal and transmits the generated channel information to the first base station. The reception unit receives the channel information from the second base station.

In an embodiment, the first base station transmits, to the second base station, terminal designation information indicating a user terminal for which a channel characteristic should be estimated. The second base station estimates the channel characteristic about the user terminal indicated by the terminal designation information to thereby generate the channel information.

In an embodiment, the first base station transmits, to the second base station, demodulation-use information for demodulating the reference signal transmitted by the user terminal. The second base station demodulates the reference signal by using the demodulation-use information to thereby generate the channel information.

A communication control method according to an embodiment is used in a mobile communication system comprising a user terminal that receives a desired wave signal from a serving cell and an interference wave signal that is a signal to another user terminal and a first base station that manages the serving cell. The communication control method comprises: in the first base station, a generation step of generating an interference replica signal corresponding to the interference wave signal; a superposition step of superposing the interference replica signal on the desired wave signal; and a transmission step of transmitting the desired wave signal superposed with the interference replica signal to the user terminal. In the generation step, the interference replica signal is generated such that the interference replica signal received by the user terminal cancels the interference wave signal received by the user terminal.

In an embodiment, the mobile communication system further comprises a second base station that manages a neighbor cell to which the another user terminal is connected and which is adjacent to the serving cell, and a management device that manages the first base station and the second base station. The communication control method comprises: in the first base station, a reception step of receiving information used for generating the interference replica signal from at least one of the second base station, the management device, and the user terminal. In the generation step, the interference replica signal is generated on the basis of the information received in the reception step.

In an embodiment, the information used for generating the interference replica signal is channel information indicating a channel characteristic between the second base station and the user terminal.

A base station according to an embodiment manages a serving cell in a mobile communication system including a user terminal that receives a desired wave signal from the serving cell and an interference wave signal that is a signal to another user terminal. The base station comprises: a control unit configured to generate an interference replica signal corresponding to the interference wave signal and to superpose the interference replica signal on the desired wave signal; and a transmission unit configured to transmit, to the user terminal, the desired wave signal superposed with the interference replica signal. The control unit generates the interference replica signal such that the interference replica signal received by the user terminal cancels the interference wave signal received by the user terminal.

In an embodiment, the base station further comprises: a reception unit configured to receive information used for generating the interference replica signal from at least one of another base station that manages a neighbor cell to which the another user terminal is connected and which is adjacent to the serving cell, a management device that manages the base station and the another base station, and the user terminal. The control unit generates the interference replica signal on the basis of the information received by the reception unit.

In an embodiment, the information used for generating the interference replica signal is channel information indicating a channel characteristic between the another base station and the user terminal.

A base station according to an embodiment manages a neighbor cell in a mobile communication system including a user terminal that receives a desired wave signal from a serving cell and an interference wave signal from the neighbor cell adjacent to the serving cell. Another base station that manages the serving cell transmits an interference replica signal corresponding to the interference wave signal by superposing the interference replica signal on the desired wave signal. The base station includes a transmission unit configured to transmit, to the another base station, the information used for generating the interference replica signal.

In an embodiment, the information used for generating the interference replica signal is channel information indicating a channel characteristic between the base station and the user terminal.

A user terminal according to an embodiment receives a desired wave signal from a serving cell and an interference wave signal that is a signal to another user terminal. A first base station that manages the serving cell transmits an interference replica signal corresponding to the interference wave signal by superposing the interference replica signal on the desired wave signal. The user terminal includes a transmission unit configured to transmit, to the first base station, the information used for generating the interference replica signal.

In an embodiment, the information used for generating the interference replica signal is channel information indicating a channel characteristic between the user terminal and a second base station that manages a neighbor cell to which the another user terminal is connected and which is adjacent to the serving cell.

A processor according to an embodiment is provided in a base station that manages a serving cell in a mobile communication system including a user terminal that receives a desired wave signal that is a signal to another user terminal. The processor executes: a generation process of generating an interference replica signal corresponding to the interference wave signal; a superposition process of superposing the interference replica signal on the desired wave signal; and a transmission process of transmitting the desired wave signal superposed with the interference replica signal to the user terminal. In the generation process, the interference replica signal is generated such that the interference replica signal received by the user terminal cancels the interference wave signal received by the user terminal.

In an embodiment, the processor further executes: a reception process of receiving information used for generating the interference replica signal from at least one of another base station that manages the neighbor cell neighbor cell to which the another user terminal is connected and which is adjacent to the serving cell, a management device that manages the base station and the another base station, and the user terminal. In the generation process, the interference replica signal is generated on the basis of the received information.

In an embodiment, the information used for generating the interference replica signal is channel information indicating a channel characteristic between the another base station and the user terminal.

A processor according to an embodiment is provided in a base station that manages a neighbor cell in a mobile communication system including a user terminal that receives a desired wave signal from a serving cell and an interference wave signal from the neighbor cell adjacent to the serving cell. Another base station that manages the serving cell transmits an interference replica signal corresponding to the interference wave signal by superposing the interference replica signal on the desired wave signal. The processor performs a process of transmitting, to the another base station, the information used for generating the interference replica signal.

In an embodiment, the information used for generating the interference replica signal is channel information indicating a channel characteristic between the base station and the user terminal.

A processor according to an embodiment is provided in a user terminal that receives a desired wave signal from a serving cell and an interference wave signal that is a signal to another user terminal. A first base station that manages the serving cell transmits an interference replica signal corresponding to the interference wave signal by superposing the interference replica signal on the desired wave signal. The processor performs a process of transmitting, to the first base station, the information used for generating the interference replica signal.

In an embodiment, the information used for generating the interference replica signal is channel information indicating a channel characteristic between the user terminal and a second base station that manages a neighbor cell to which the another user terminal is connected and which is adjacent to the serving cell.

First Embodiment

Hereinafter, with reference to the accompanying drawings, a description will be provided for an embodiment when the present invention is applied to a mobile communication system (an LTE system) configured in accordance with 3GPP standards.

(LTE System)

FIG. 1 is a configuration diagram of an LTE system according to the present embodiment.

As illustrated in FIG. 1, the LTE system includes a plurality of UEs (User Equipments) 100, an E-UTRAN (Evolved Universal Terrestrial Radio Access Network) 10, and an EPC (Evolved Packet Core) 20. The EPC 20 corresponds to a core network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 manages one or a plurality of cells and performs radio communication with the UE 100 with which a connection with the cell of the eNB 200 is established.

It is noted that the "cell" is used as a term indicating a minimum unit of a radio communication area, and is also used as a term indicating a function of performing radio communication with the UE 100.

The eNB 200 has a radio resource management (RRM) function, a routing function of user data, and a measurement control function for mobility control and scheduling.

The EPC 20 includes a plurality of MME (Mobility Management Entity)/S-GWs (Serving-Gateways) 300.

The MME is a network node for performing various mobility controls, for example, for the UE 100, and corresponds to a controller. The S-GW is a network node that performs transfer control of user data and corresponds to a mobile switching center. The EPC 20 including the MME/S-GW 300 accommodates the eNB 200.

The eNBs 200 are connected mutually via an X2 interface. Furthermore, the eNB 200 is connected to the MME/S-GW 300 via an S1 interface.

Next, the configurations of the UE 100 and the eNB 200 will be described.

Figure 2:
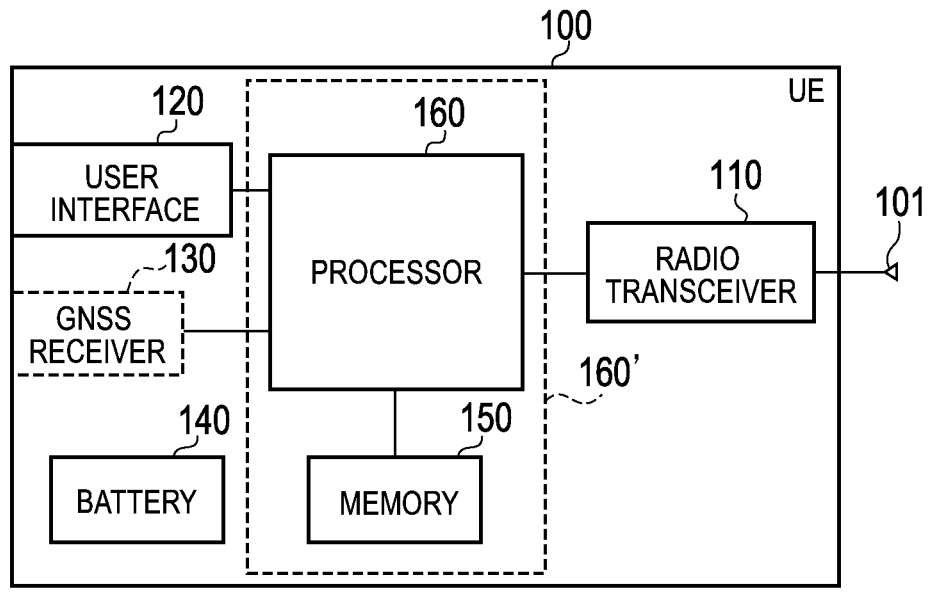
FIG. 2 is a block diagram of UE according to the first embodiment and the second embodiment.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. A plurality of antennas 101 may be provided. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and for example, includes a display, a microphone, a speaker, various buttons and the like. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of a baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
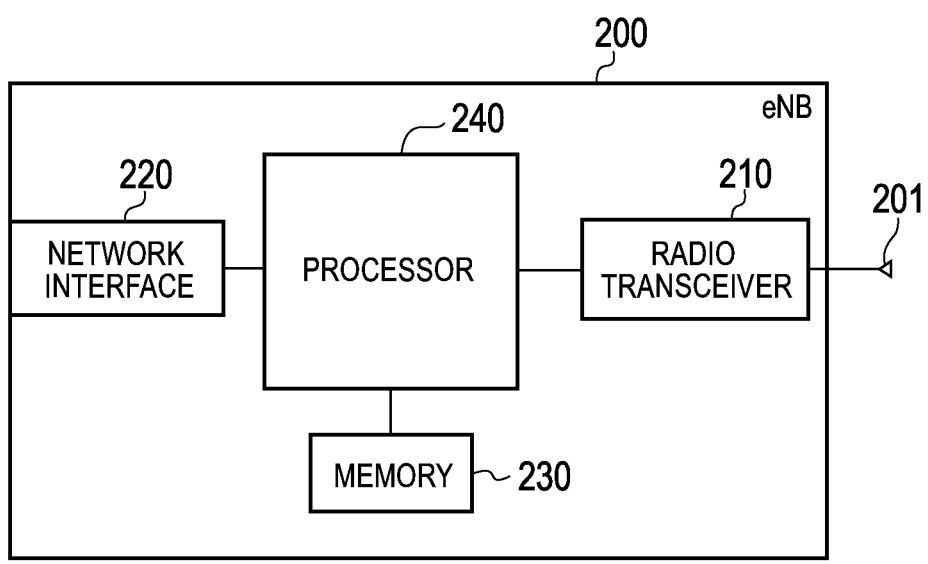
FIG. 3 is a block diagram of eNB according to the first embodiment and the second embodiment.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. Further, the memory 230 may be integrally formed with the processor 240, and this set (that is, a chipset) may be called a processor.

The antenna 201 and the radio transceiver 210 are used to transmit and receive a radio signal. A plurality of antennas 201 may be provided. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighbor eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes a baseband processor that performs modulation and demodulation, encoding and decoding and the like of a baseband signal, and a CPU that performs various processes by executing the program stored in the memory 230. The processor 240 implements various processes and various communication protocols described later.

Figure 4:
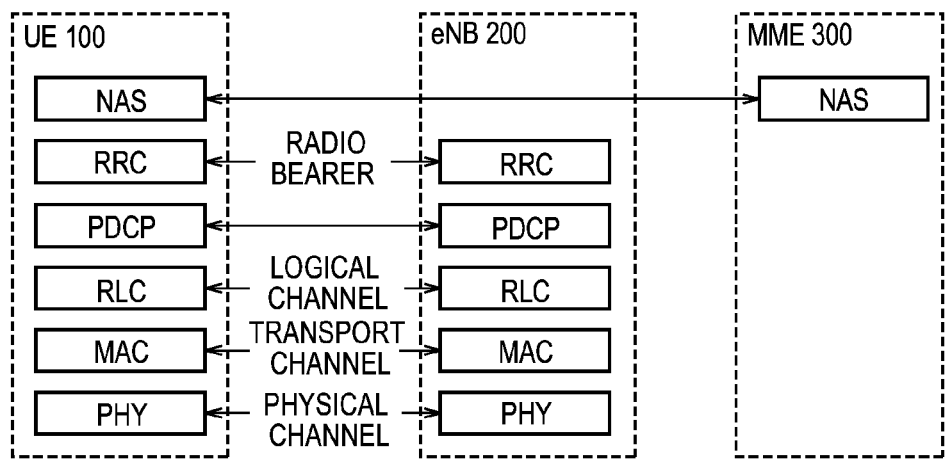
FIG. 4 is a protocol stack diagram of a radio interface in an LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, resource mapping and demapping, and the like. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for determining a transport format (a transport block size, a modulation and coding scheme, and the like) of an uplink and a downlink, and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (an RRC connected state), and when there is no RRC connection, the UE 100 is in an idle state (an RRC idle state).

A NAS (Non-Access Stratum) layer positioned above the RRC layer performs session management, mobility management and the like.

Figure 5:
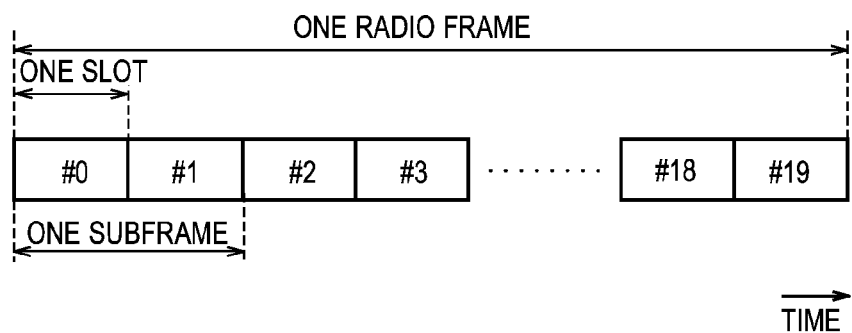
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called a cyclic prefix (CP). The resource block includes a plurality of subcarriers in the frequency direction. A minimum resource unit configured by one subcarrier and one symbol is called a resource element (RE).

Furthermore, among radio resources assigned to the UE 100, a frequency resource can be designated by a resource block and a time resource can be designated by a subframe (or a slot).

In the uplink, both ends, in the frequency direction, of each subframe are control regions mainly used as a physical uplink control channel (PUCCH). Furthermore, the center portion, in the frequency direction, of each subframe is a region that can be mainly used as a physical uplink shared channel (PUSCH). Moreover, in each subframe, a sounding reference signal (SRS) is arranged.

Figure 6:
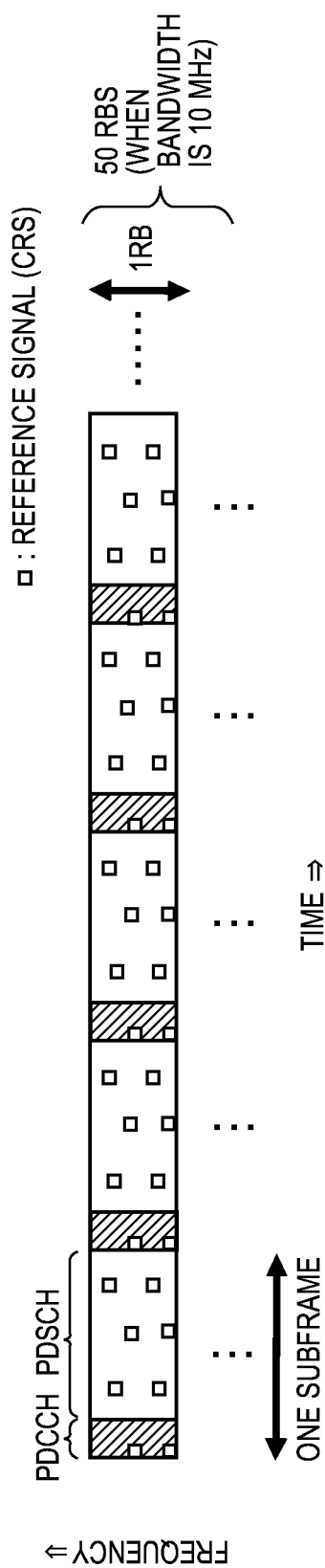
FIG. 6 is a configuration diagram of a radio frame used in a downlink.

FIG. 6 is a configuration diagram of a radio frame used in a downlink.

As illustrated in FIG. 6, in the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH).

In a downlink, a cell-specific reference signal (CRS) and/or a downlink reference signal such as a channel-state-information reference signal (CSI-RS) are dispersed and arranged in each subframe. The downlink reference signal is configured by a predetermined orthogonal signal sequence, and arranged in a predetermined resource element.

(Overview of Coordinated Interference Cancellation Scheme)

Figure 7:
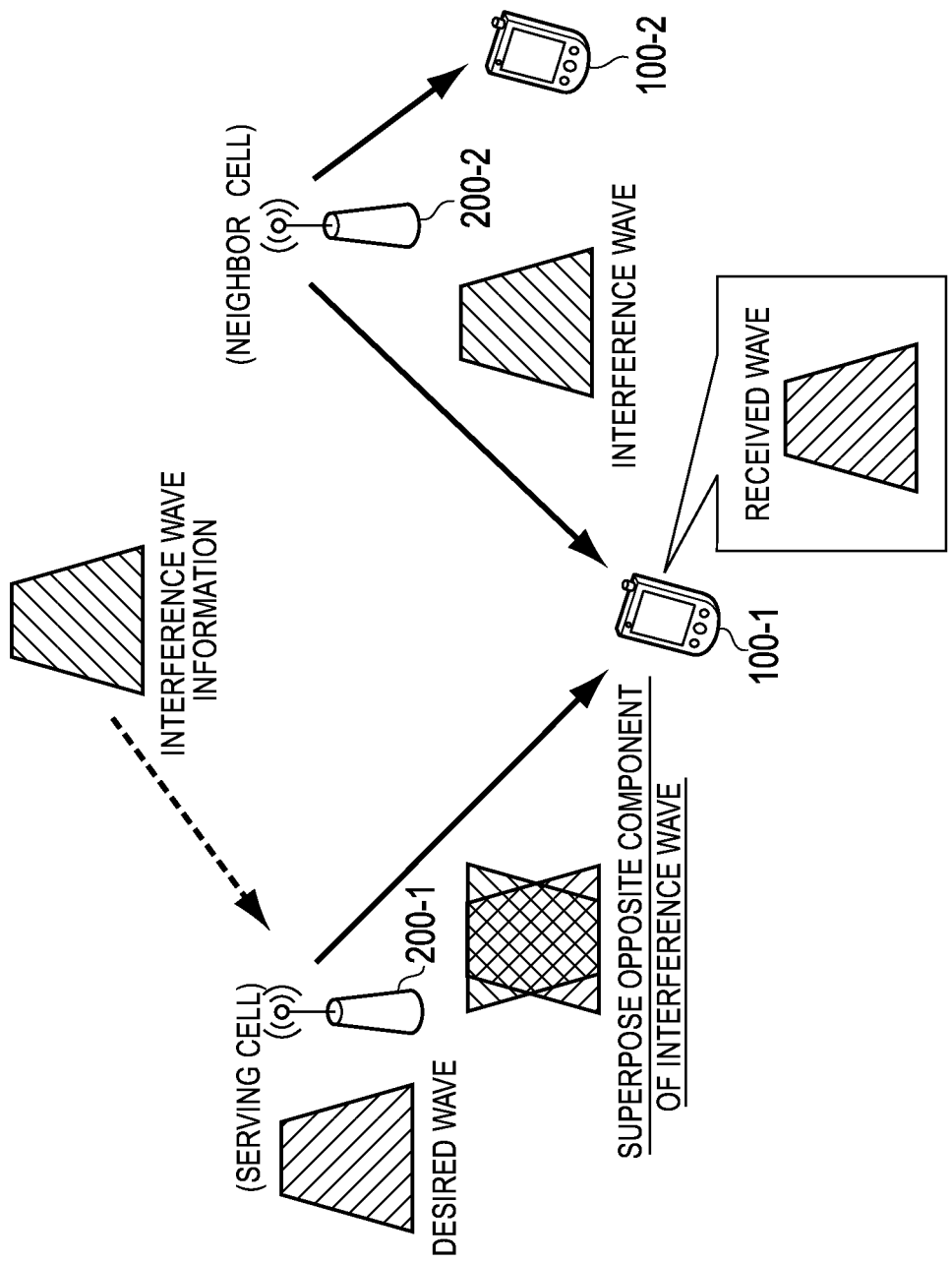
FIG. 7 is a diagram for explaining the overview of a coordinated interference cancellation scheme according to the first embodiment and the second embodiment.

FIG. 7 is a diagram for explaining the overview of the coordinated interference cancellation scheme according to the present embodiment.

As illustrated in FIG. 7, UE 100-1 is a UE to which the coordinated interference cancellation scheme is applied. The UE 100-1 establishes a connection (an RRC connection) with a cell managed by eNB 200-1. That is, the cell managed by the eNB 200-1 corresponds to a serving cell of the UE 100-1.

In the present embodiment, a neighbor cell adjacent to the serving cell is managed by eNB 200-2 different from the eNB 200-1. In the example of FIG. 7, UE 100-2 establishes a connection (an RRC connection) with a cell managed by the eNB 200-2. In addition, the eNB 200-1 and the eNB 200-2 synchronize with each other.

The eNB 200-1 and the eNB 200-2 are connected mutually via an X2 interface. Furthermore, the eNB 200-1 and the eNB 200-2 are connected to a MME/S-GW 300 via the S1 interface.

The UE 100-1 is located around the boundary between the cell (the serving cell) managed by the eNB 200-1 and the cell (the neighbor cell) managed by the eNB 200-2. Thus, when the eNB 200-2 performs transmission to the UE 100-2 by using a radio resource equal to that used in the eNB 200-1, the UE 100-1 receives downlink interference from the eNB 200-2. That is, the UE 100-1 receives a desired wave signal from the serving cell and also receives an interference wave signal from the neighbor cell.

In such an operation environment, the eNB 200-1 generates an interference replica signal corresponding to the interference wave signal and superposes the interference replica signal on the desired wave signal. Then, the eNB 200-1 transmits the desired wave signal superposed with the interference replica signal to the UE 100-1.

Furthermore, the eNB 200-1 generates the interference replica signal such that the interference replica signal received in the UE 100-1 cancels the interference wave signal received in the UE 100-1. Specifically, the eNB 200-1 generates the interference replica signal such that a phase of the interference replica signal received in the UE 100-1 is opposite to a phase of the interference wave signal received in the UE 100-1. Furthermore, the eNB 200-1 generates the interference replica signal such that an amplitude of the interference replica signal received in the UE 100-1 is equal to an amplitude of the interference wave signal received in the UE 100-1.

In this way, the interference replica signal is synthesized with the interference wave signal in an opposite phase in the location of the UE 100-1, and cancels the interference wave signal. Accordingly, it is possible to reduce received power of the interference wave signal in the UE 100-1, resulting in the improvement of SIR. Furthermore, since it is not necessary to ensure a radio resource for the UE 100-1, in the neighbor cell, it is possible to improve the use efficiency of a radio resource as compared with JT-CoMP, DPS-CoMP, and CS-CoMP. Moreover, when the eNB 200-2 does not have a plurality of antennas, that is, even when beamforming and null steering are not possible, the present scheme (the coordinated interference cancellation scheme) is applicable.

Furthermore, the interference replica signal remains without being synthesized with the interference wave signal in an opposite phase in a location other than the location of the UE 100-1. Accordingly, the interference replica signal also acts as a disturbing signal, which disturbs the demodulation of the desired wave signal, in the location other than the location of the UE 100-1. Consequently, according to the coordinated interference cancellation scheme, it is also possible to enhance the confidentiality of communication.

The eNB 200-1 acquires at least a part of information, which is necessary for generating the interference replica signal, from at least one of the eNB 200-2, the MME/S-GW 300, and the UE 100-1.

In order to generate the interference replica signal, firstly, information (interference wave information) on a signal waveform of the interference wave signal transmitted by the eNB 200-2 is necessary.

However, the interference wave signal transmitted by the eNB 200-2 receives the influence of a channel characteristic between the eNB 200-2 and the UE 100-1, and is received in the UE 100-1. Accordingly, in order to generate the interference replica signal, secondly, information (channel information) on the channel characteristic between the eNB 200-2 and the UE 100-1 is necessary.

Moreover, in order to improve the accuracy of the interference replica signal, information other than interference wave information and the channel information is also available. Details of such information will be described later.

(Configuration of eNB 200-1)

Figure 8:
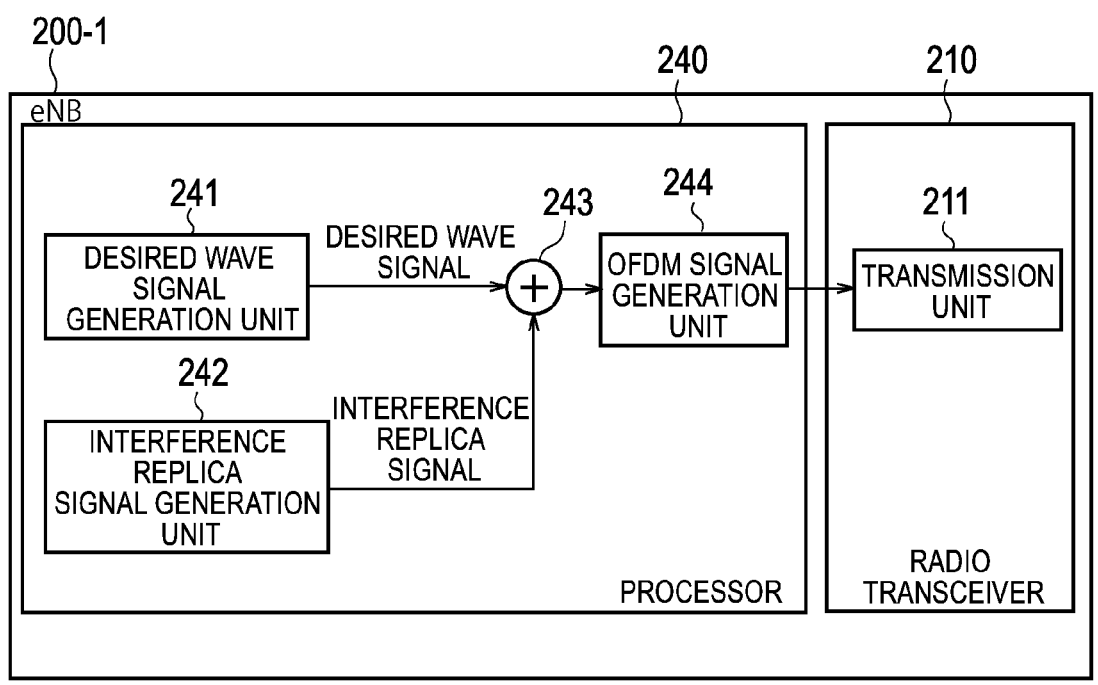
FIG. 8 is a block diagram of eNB for realizing the coordinated interference cancellation scheme.

FIG. 8 is a block diagram of the eNB 200-1 for realizing the coordinated interference cancellation scheme.

As illustrated in FIG. 8, the processor 240 includes a desired wave signal generation unit 241 that generates the desired wave signal, an interference replica signal generation unit 242 that generates the interference replica signal, a superposition unit 243 that superposes the interference replica signal on the desired wave signal, and an OFDM signal generation unit 244 that generates an OFDM signal (a superposition signal) from the desired wave signal superposed with the interference replica signal. The radio transceiver 210 includes a transmission unit 211 that amplifies and transmits the OFDM signal (the superposition signal).

The desired wave signal generation unit 241 performs transmission processing on transmission data (user data) to the UE 100-1, thereby converting the transmission data to the UE 100-1 into the desired wave signal. The transmission processing includes a coding process, a modulation process, a precoding process, and a resource mapping process.

The coding process is a process for coding the transmission data. The coding process may include a process for adding an error detecting code (a CRC code) to the transmission data, a scrambling process and the like.

The modulation process is a process for modulating the coded transmission data (the coded data).

The precoding process is a process for precoding the coded data (a desired wave signal waveform) modulated on the basis of channel information indicating a channel characteristic between the eNB 200-1 and the UE 100-1.

In addition, hereinafter, the channel information indicating the channel characteristic between the eNB 200-1 and the UE 100-1 is called "channel information 1" and the channel information indicating the channel characteristic between the eNB 200-2 and the UE 100-1 is called "channel information 2".

The resource mapping process is a process for mapping the precoded desired wave signal waveform to a physical resource.

As a result of these processes, the desired wave signal generation unit 241 outputs the desired wave signal to the superposition unit 243.

On the basis of at least the channel information 2, the interference replica signal generation unit 242 adjusts the phase and the amplitude of an interference wave signal waveform corresponding to the interference wave information to generate the interference replica signal. Furthermore, the interference replica signal generation unit 242 also adds information for improving the accuracy of the interference replica signal, and generates the interference replica signal. Moreover, the interference replica signal generation unit 242 may also adjust transmission power in the radio transceiver 210.

Specifically, the interference replica signal generation unit 242 generates the interference replica signal such that the phase of the interference replica signal received in the UE 100-1 is opposite to the phase of the interference wave signal received in the UE 100-1. Furthermore, the eNB 200-1 generates the interference replica signal such that an amplitude of the interference replica signal received in the UE 100-1 is equal to an amplitude of the interference wave signal received in the UE 100-1.

For example, the interference replica signal generation unit 242 estimates the interference wave received waveform received in the UE 100-1 by using the interference wave information and the channel information 2. Next, the interference replica signal generation unit 242 maps (vectorizes) the interference wave received waveform on a phase plane, and rotates a phase by 180 degrees while keeping an amplitude constant, thereby generating an interference replica signal (a replica vector). However, in consideration of the difference of a CRS location or the presence or absence of DMRS (a reference signal for demodulation), it is necessary to generate a replica to correspond to a resource element position. Furthermore, the replica is not superposed on the CRS location of the serving cell.

Firstly, a method of acquiring the interference wave information will be described. The interference wave information, for example, is an interference wave signal waveform. The interference wave signal waveform is a waveform of a signal after modulation in the eNB 200-2. Alternatively, when it is possible to acquire a waveform (an opposite characteristic interference signal waveform) of a signal having a phase opposite to the interference wave signal waveform and an amplitude equal to the interference wave signal waveform, the interference wave information may be an opposite characteristic interference signal.

When the interference wave information is the interference wave signal waveform or the opposite characteristic interference signal waveform, the network interface 220 of the eNB 200-1 receives the interference wave signal waveform or the opposite characteristic interference signal waveform from the eNB 200-1. Then, the interference replica signal generation unit 242 acquires the interference wave signal waveform or the opposite characteristic interference signal waveform received in the network interface 220.

Alternatively, the interference wave information is transmission data (user data to the UE 100-2) before being converted into an interference wave signal in the eNB 200-2. The transmission data may be transmission data before being coded or transmission data after being coded.

In addition, hereinafter, transmission data for the UE 100-1 is called "transmission data 1" and transmission data for the UE 100-2 is called "transmission data 2".

When the interference wave information is the transmission data 2, the network interface 220 of the eNB 200-1 receives the transmission data 2 from the eNB 200-1 or the MME/S-GW 300. The interference replica signal generation unit 242 acquires the transmission data 2 received in the network interface 220.

Furthermore, when the interference wave information is the transmission data 2, the interference replica signal generation unit 242 needs to perform the same transmission processing as the transmission processing that is performed for the transmission data 2 by the eNB 200-2, and to generate the interference wave signal waveform. Accordingly, the network interface 220 of the eNB 200-1 receives, from the eNB 200-2, transmission processing information indicating the content of the transmission processing that is performed for the transmission data 2 by the eNB 200-2. The content of the transmission processing, for example, is the content of the coding process, the content of the modulation process, and the content of the resource mapping process. The interference replica signal generation unit 242 acquires the transmission processing information received in the network interface 220.

Secondly, a method of acquiring the channel information 2 will be described. Since the channel information 2 is information indicating a downlink channel characteristic, the channel information 2 is generated in the UE 100-1 in the case of FDD. On the other hand, in the case of TDD, the channel information 2 is generated in the UE 100-1 or the eNB 200-2.

In addition, when the interference wave information is the opposite characteristic interference signal waveform, it is noted that the interference replica signal generation unit 242 does not need to acquire the channel information 2.

When the channel information 2 is generated in the UE 100-1, the channel information 2 may be directly transmitted from the UE 100-1 to the eNB 200-1 or indirectly transmitted from the UE 100-1 to the eNB 200-1 via the eNB 200-2.

The network interface 220 of the eNB 200-1 receives the channel information 2 from the eNB 200-2. Alternatively, the radio transceiver 210 of the eNB 200-1 receives the channel information 2 from the UE 100-1. The interference replica signal generation unit 242 acquires the channel information 2 received in the network interface 220 or the radio transceiver 210.

Thirdly, a method of acquiring information for improving the accuracy of the interference replica signal will be described.

The information for improving the accuracy of the interference replica signal is received power information indicating received power (RSRP; Reference Signal Received Power) for a reference signal received in the UE 100-1 from the eNB 200-2. The interference replica signal generation unit 242 adds the received power information, thereby making it possible to appropriately adjust the amplitude (including transmission power) of the interference replica signal.

The received power information is generated in the UE 100-1. The received power information may be directly transmitted from the UE 100-1 to the eNB 200-1 or indirectly transmitted from the UE 100-1 to the eNB 200-1 via the eNB 200-2.

The network interface 220 of the eNB 200-1 receives the received power information from the eNB 200-2. Alternatively, the radio transceiver 210 of the eNB 200-1 receives the received power information from the UE 100-1. The interference replica signal generation unit 242 acquires the received power information received in the network interface 220 or the radio transceiver 210.

Alternatively, the information for improving the accuracy of the interference replica signal is difference information indicating at least one of an amplitude difference and a phase difference between the reference signal (CRS) and the data signal that are transmitted by the eNB 200-2. The data signal is a signal that is transmitted by the eNB 200-2 on the physical downlink shared channel (PDSCH). The interference replica signal generation unit 242 adds the difference information, thereby making it possible to appropriately adjust the amplitude and/or the phase of the interference replica signal.

The difference information is generated in the eNB 200-2. The eNB 200-2 transmits the difference information to the eNB 200-1. The network interface 220 of the eNB 200-1 receives the difference information from the eNB 200-2. The interference replica signal generation unit 242 acquires the difference information received in the network interface 220.

Alternatively, the information for improving the accuracy of the interference replica signal is power difference information indicating a power difference between a reference signal (CRS) and the data signal that are transmitted by the eNB 200-2. The interference replica signal generation unit 242 adds the power difference information, thereby making it possible to appropriately adjust the amplitude (including transmission power) of the interference replica signal.

The power difference information, for example, is power difference information (information indicating a transmission power difference) generated in the eNB 200-2. The power difference information may be directly transmitted from the eNB 200-2 to the eNB 200-1 or indirectly transmitted from the eNB 200-2 to the eNB 200-1 via the UE 100-1.

The network interface 220 of the eNB 200-1 receives the power difference information from the eNB 200-2. Alternatively, the radio transceiver 210 of the eNB 200-1 receives the power difference information from the UE 100-1. The interference replica signal generation unit 242 acquires the power difference information received in the network interface 220 or the radio transceiver 210.

Alternatively, the information for improving the accuracy of the interference replica signal is time difference information indicating a delay time difference between a delay time from the eNB 200-1 to the UE 100-1 and a delay time from the eNB 200-2 to the UE 100-1. The interference replica signal generation unit 242 adds the time difference information, thereby making it possible to appropriately adjust the transmission timing of the interference replica signal.

The time difference information is generated in the UE 100-1. The time difference information may be directly transmitted from the UE 100-1 to the eNB 200-1 or indirectly transmitted from the UE 100-1 to the eNB 200-1 via the eNB 200-2.

The network interface 220 of the eNB 200-1 receives the time difference information from the eNB 200-2. Alternatively, the radio transceiver 210 of the eNB 200-1 receives the time difference information from the UE 100-1. The interference replica signal generation unit 242 acquires the time difference information received in the network interface 220 or the radio transceiver 210.

(Operation According to First Embodiment)

Hereinafter, an operation according to the present embodiment will be described in sequence of an operation pattern 1 to an operation pattern 8.

(1) Operation Pattern 1

Figure 9:
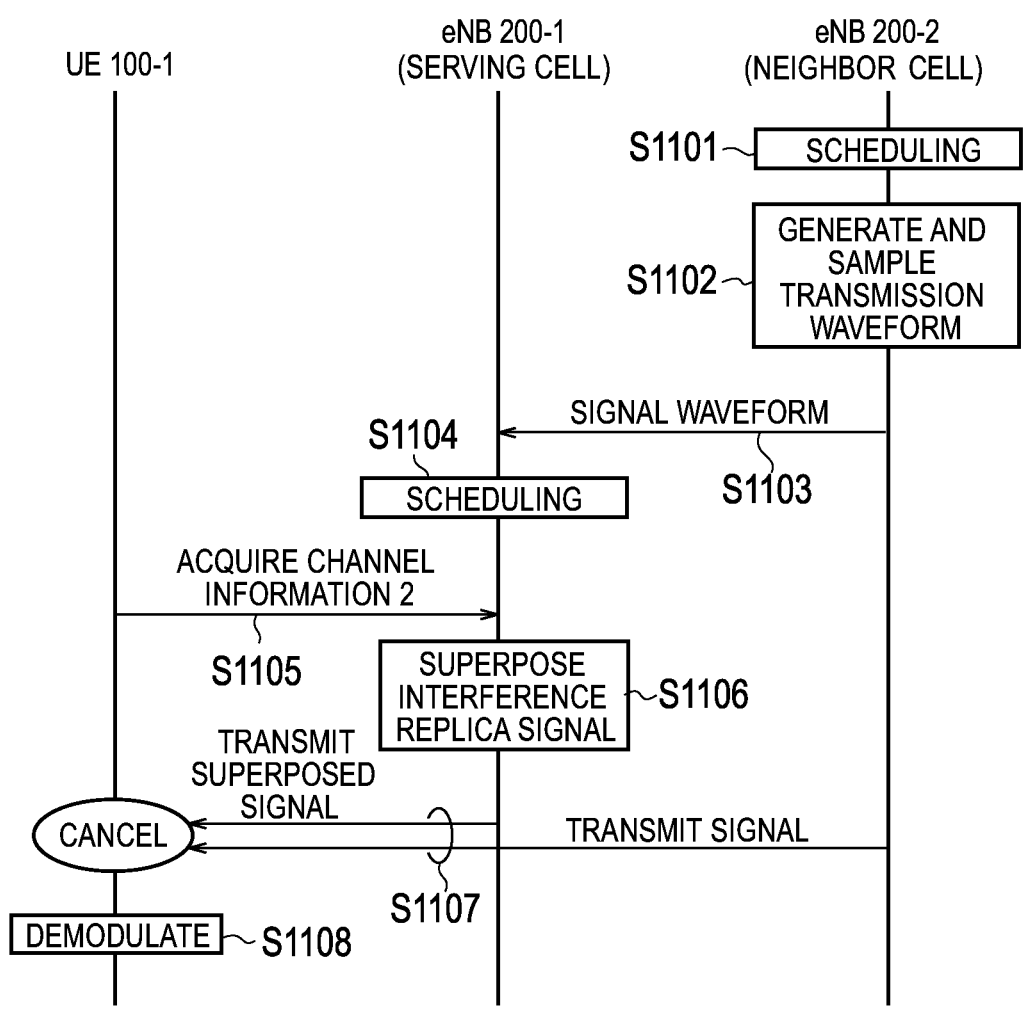
FIG. 9 is a sequence diagram of an operation pattern 1 according to the first embodiment.

FIG. 9 is a sequence diagram of an operation pattern 1 according to the present embodiment. In the operation pattern 1, interference wave information acquired by the eNB 200-1 is an interference signal waveform.

As illustrated in FIG. 9, in step S1101, the eNB 200-2 performs scheduling (or pre-scheduling) for the UE 100-2 that is connected to the cell of the eNB 200-2.

In step S1102, on the basis of a result of the scheduling, the eNB 200-2 generates a transmission signal waveform from transmission data 2 and samples the transmission signal waveform.

In step S1103, the eNB 200-2 transmits the sampled transmission signal waveform to the eNB 200-1. Furthermore, the sampled transmission signal waveform corresponds to an interference signal waveform.

In step S1104, the eNB 200-1 performs scheduling for the UE 100-1 that is connected to the cell of the eNB 200-1, and generates a transmission signal waveform (a desired wave signal waveform).

In step S1105, the eNB 200-1 acquires channel information 2. A detailed example of an operation, in which the eNB 200-1 acquires the channel information 2, will be described later.

In step S1106, on the basis of the channel information 2, the eNB 200-1 generates an opposite characteristic signal of an interference signal waveform as an interference replica signal. Then, the eNB 200-1 superposes the interference replica signal on a desired wave signal.

In step S1107, the eNB 200-2 performs transmission to the UE 100-2. The UE 100-1 receives a signal from the eNB 200-2 as an interference wave signal. Meanwhile, the eNB 200-1 transmits a superposition signal to the UE 100-1. The UE 100-1 receives the superposition signal. Furthermore, the interference wave signal is canceled by the interference replica signal included in the superposition signal.

In step S1108, the UE 100-1 demodulates the desired wave signal included in the superposition signal.

In addition, in the present operation pattern, it is mainly assumed that the interference wave signal is canceled at a UE receiving end (the state of a radio signal). However, at the time of demodulation (the state of a baseband signal), the interference wave signal may be canceled. This is the same in the following operation patterns.

Figure 10:
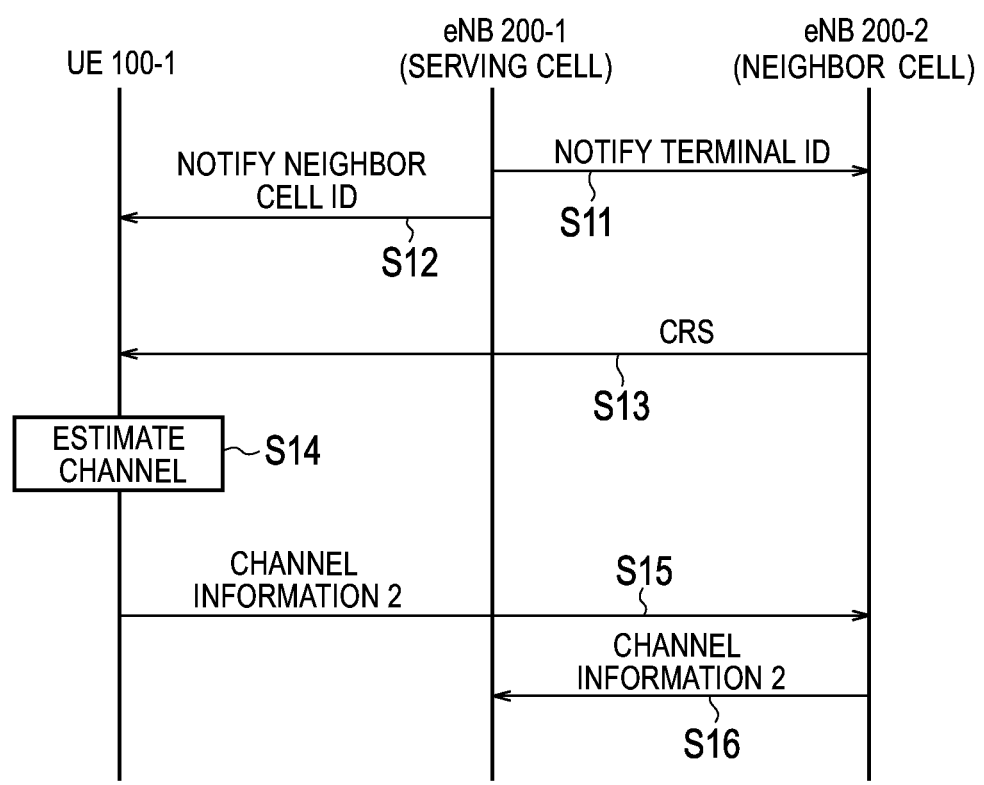
FIG. 10 is a sequence diagram of an operation example 1 in which channel information 2 is acquired according to the first embodiment.

FIG. 10 is a sequence diagram of an operation example 1 in which the eNB 200-1 acquires the channel information 2. In the present operation example, the channel information 2 is generated in the UE 100-1 and is transmitted from the UE 100-1 to the eNB 200-1 via the eNB 200-2.

As illustrated in FIG. 10, in step S11, the eNB 200-1 transmits, to the eNB 200-2, an identifier (a terminal ID) of the UE 100-1 to which the coordinated interference cancellation scheme is applied.

In step S12, the eNB 200-1 transmits, to the UE 100-1, an identifier (a cell ID) of a neighbor cell from which the UE 100-1 should acquire the channel information 2. The cell ID corresponds to cell designation information indicating a cell for which a channel characteristic should be estimated.

In step S13, the eNB 200-2 transmits a reference signal (CRS).

In step S14, on the basis of the cell ID received from the eNB 200-1, the UE 100-1 receives the reference signal (CRS) from the eNB 200-2. Then, the UE 100-1 performs channel estimation on the basis of the CRS and generates the channel information 2. As described above, the UE 100-1 estimates channel characteristic for the cell indicated by the cell ID received from the eNB 200-1, thereby generating the channel information 2.

In step S15, on the basis of the cell ID received from the eNB 200-1, the UE 100-1 transmits the channel information 2 to the eNB 200-2. Furthermore, the UE 100-1 adds the terminal ID of the UE 100-1 to the channel information 2, and transmits the channel information 2.

In step S16, on the basis of the terminal ID received from the eNB 200-1, the eNB 200-2 transfers the channel information 2, which was received from the UE 100-1, to the eNB 200-1. The eNB 200-1 receives the channel information 2 from the eNB 200-2.

Figure 11:
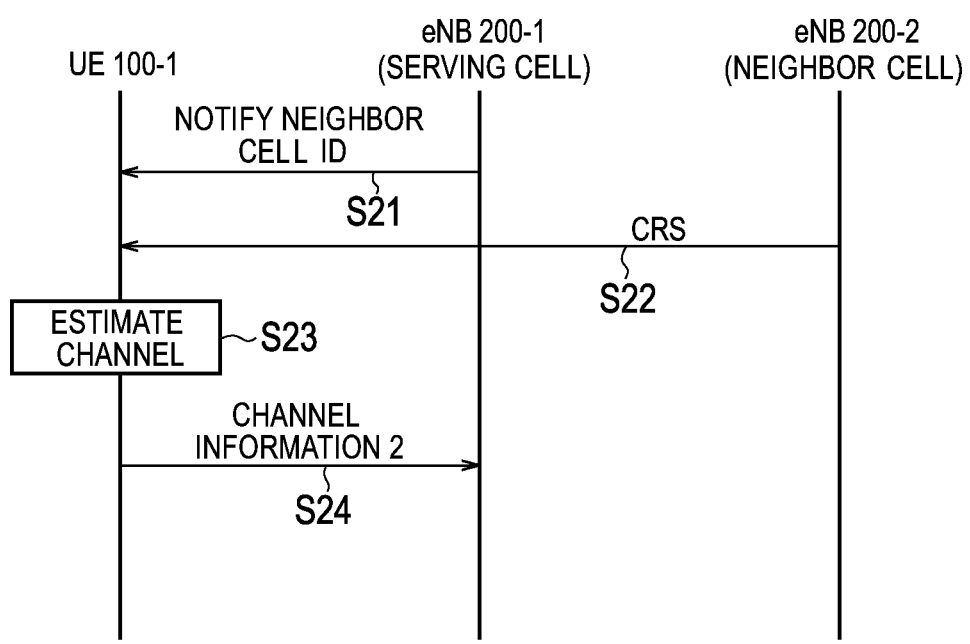
FIG. 11 is a sequence diagram of an operation example 2 in which channel information 2 is acquired according to the first embodiment.

FIG. 11 is a sequence diagram of an operation example 2 in which the eNB 200-1 acquires the channel information 2. In the present operation example, the channel information 2 is generated in the UE 100-1 and is directly transmitted from the UE 100-1 to the eNB 200-1.

As illustrated in FIG. 11, in step S21, the eNB 200-1 transmits, to the UE 100-1, an identifier (a cell ID) of a neighbor cell from which the UE 100-1 should acquire the channel information 2. The cell ID corresponds to cell designation information indicating a cell for which a channel characteristic should be estimated.

In step S22, the eNB 200-2 transmits a reference signal (CRS).

In step S23, on the basis of the cell ID received from the eNB 200-1, the UE 100-1 receives the reference signal (CRS) from the eNB 200-2. Then, the UE 100-1 performs channel estimation on the basis of the CRS and generates the channel information 2. As described above, the UE 100-1 estimates channel characteristic for the cell indicated by the cell ID received from the eNB 200-1, thereby generating the channel information 2.

In step S24, on the basis of the cell ID received from the eNB 200-1, the UE 100-1 transmits the channel information 2 to the eNB 200-1. The eNB 200-1 receives the channel information 2 from the UE 100-1.

Figure 12:
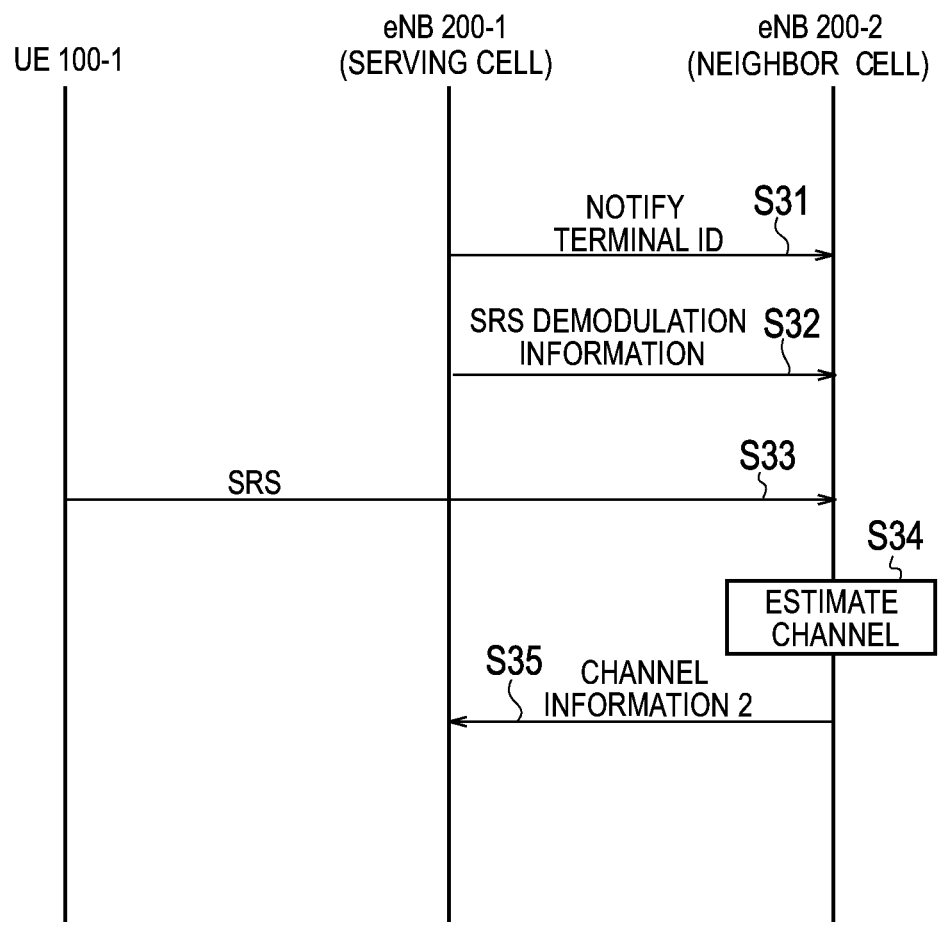
FIG. 12 is a sequence diagram of an operation example 3 in which channel information 2 is acquired according to the first embodiment.

FIG. 12 is a sequence diagram of an operation example 3 in which the eNB 200-1 acquires the channel information 2. In the present operation example, the channel information 2 is generated in the eNB 200-2 and is transmitted from the eNB 200-2 to the eNB 200-1.

As illustrated in FIG. 12, in step S31, the eNB 200-1 transmits, to the eNB 200-2, an identifier (a terminal ID) of the UE 100-1 to which the coordinated interference cancellation scheme is applied. The terminal ID corresponds to terminal designation information indicating UE for which a channel characteristic should be estimated.

In step S32, the eNB 200-1 transmits, to the eNB 200-2, SRS demodulation information for demodulating a reference signal (SRS) that is transmitted by the UE 100-1. The SRS demodulation information includes an SRS insertion subframe interval, an orthogonal code of a target UE, an SRS bandwidth, an SRS frequency domain position, an SRS hopping band and the like. The SRS demodulation information may further include a subframe start position and a system bandwidth. In addition, the eNB 200-1 may control the above-described terminal ID to be included into the SRS demodulation information, and transmit the SRS demodulation information to the eNB 200-2. In this case, step S31 may be omitted.

In step S33, the UE 100-1 transmits a reference signal (SRS).

In step S34, on the basis of the SRS demodulation information received from the eNB 200-1, the eNB 200-2 receives and demodulates the reference signal (SRS) from the UE 100-1. Then, the eNB 200-2 performs channel estimation on the basis of the SRS and generates the channel information 2.

In step S35, the eNB 200-2 transmits the channel information 2 to the eNB 200-1. The eNB 200-1 receives the channel information 2 from the eNB 200-2.

(2) Operation Pattern 2

Figure 13:
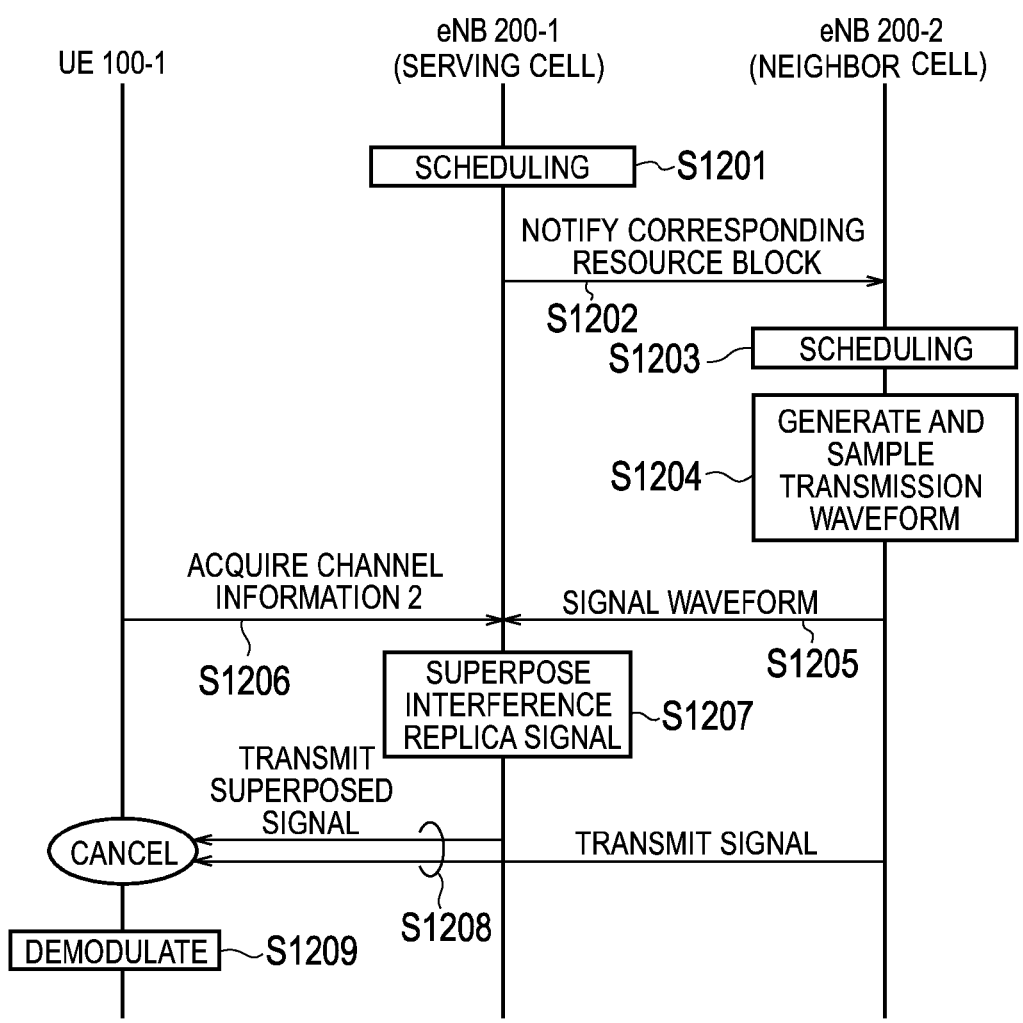
FIG. 13 is a sequence diagram of an operation pattern 2 according to the first embodiment.

FIG. 13 is a sequence diagram of an operation pattern 2 according to the present embodiment. The operation pattern 2 is obtained by changing a part of the operation pattern 1.

As illustrated in FIG. 13, in step S1201, the eNB 200-1 performs scheduling (or pre-scheduling) for the UE 100-1 that is connected to the cell of the eNB 200-1.

In step S1202, on the basis of a result of the scheduling, the eNB 200-1 transmits resource information indicating an assignment resource block for the UE 100-1 to the eNB 200-2. The resource information corresponds to information indicating a radio resource that is used in the transmission of a desired wave signal.

In step S1203, the eNB 200-2 performs scheduling for the UE 100-2 that is connected to the cell of the eNB 200-2.

In step S1204, on the basis of a result of the scheduling, the eNB 200-2 generates a transmission signal waveform from transmission data 2 with respect to a resource block corresponding to the resource information received from the eNB 200-1, and samples the transmission signal waveform.

In step S1205, the eNB 200-2 transmits the sampled transmission signal waveform to the eNB 200-1. Furthermore, the sampled transmission signal waveform corresponds to an interference signal waveform.

In step S1206, the eNB 200-1 acquires the channel information 2. An operation example in which the channel information 2 is acquired is the same as that of the aforementioned operation pattern 1.

In step S1207, on the basis of the channel information 2, the eNB 200-1 generates an opposite characteristic signal of a desired wave signal waveform as an interference replica signal. Then, the eNB 200-1 superposes the interference replica signal on a desired wave signal.

In step S1208, the eNB 200-2 performs transmission to the UE 100-2. The UE 100-1 receives a signal from the eNB 200-2 as an interference wave signal. Meanwhile, the eNB 200-1 transmits a superposition signal to the UE 100-1. The UE 100-1 receives the superposition signal. Furthermore, the interference wave signal is canceled by the interference replica signal included in the superposition signal.

In step S1209, the UE 100-1 demodulates the desired wave signal included in the superposition signal.

(3) Operation Pattern 3

Figure 14:
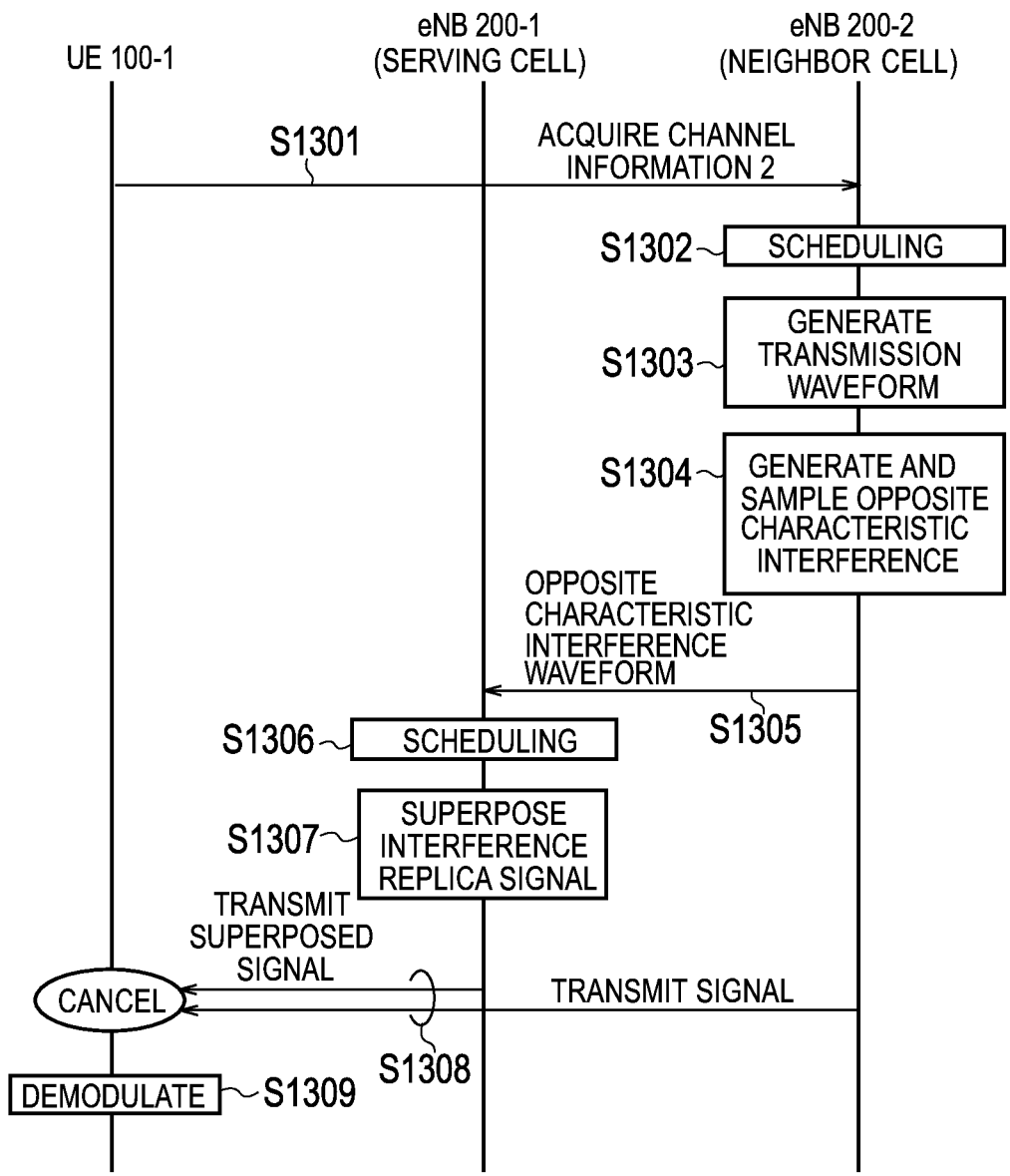
FIG. 14 is a sequence diagram of an operation pattern 3 according to the first embodiment.

FIG. 14 is a sequence diagram of an operation pattern 3 according to the present embodiment. In the operation pattern 3, interference wave information acquired by the eNB 200-1 is an opposite characteristic interference signal waveform.

As illustrated in FIG. 14, in step S1301, the eNB 200-2 acquires the channel information 2 from the UE 100-1. Alternatively, the eNB 200-2 by itself may acquire the channel information 2.

In step S1302, the eNB 200-2 performs scheduling (or pre-scheduling) for the UE 100-2 that is connected to the cell of the eNB 200-2.

In step S1303, on the basis of a result of the scheduling, the eNB 200-2 generates a transmission signal waveform (an interference wave signal waveform) from transmission data 2.

In step S1304, on the basis of the channel information 2, the eNB 200-2 generates an opposite characteristic of the interference wave signal waveform as an opposite characteristic interference waveform, and samples the opposite characteristic interference waveform.

In step S1305, the eNB 200-2 transmits the sampled opposite characteristic interference waveform to the eNB 200-1.

In addition, similarly to the aforementioned operation pattern 2, a waveform notification may be performed on the basis of resource information. Specifically, before step S1302, the eNB 200-1 transmits resource information indicating an assignment resource block for the UE 100-1 to the eNB 200-2, and the eNB 200-2 generates and samples a transmission signal waveform for a resource block corresponding to the resource information. In this way, it is advantageous that the amount of a signal transmitted on the X2 interface is reduced and it is enough for the eNB 200-1 simply to superpose an opposite characteristic signal.

In step S1306, the eNB 200-1 performs scheduling for the UE 100-1 that is connected to the cell of the eNB 200-1, and generates a transmission signal waveform (a desired wave signal waveform).

In step S1307, the eNB 200-1 generates an interference replica signal by the opposite characteristic interference waveform received from the eNB 200-2. Then, the eNB 200-1 superposes the interference replica signal on a desired wave signal.

In step S1308, the eNB 200-2 performs transmission to the UE 100-2. The UE 100-1 receives a signal from the eNB 200-2 as an interference wave signal. Meanwhile, the eNB 200-1 transmits a superposition signal to the UE 100-1. The UE 100-1 receives the superposition signal. Furthermore, the interference wave signal is canceled by the interference replica signal included in the superposition signal.

In step S1309, the UE 100-1 demodulates the desired wave signal included in the superposition signal.

(4) Operation Pattern 4

Figure 15:
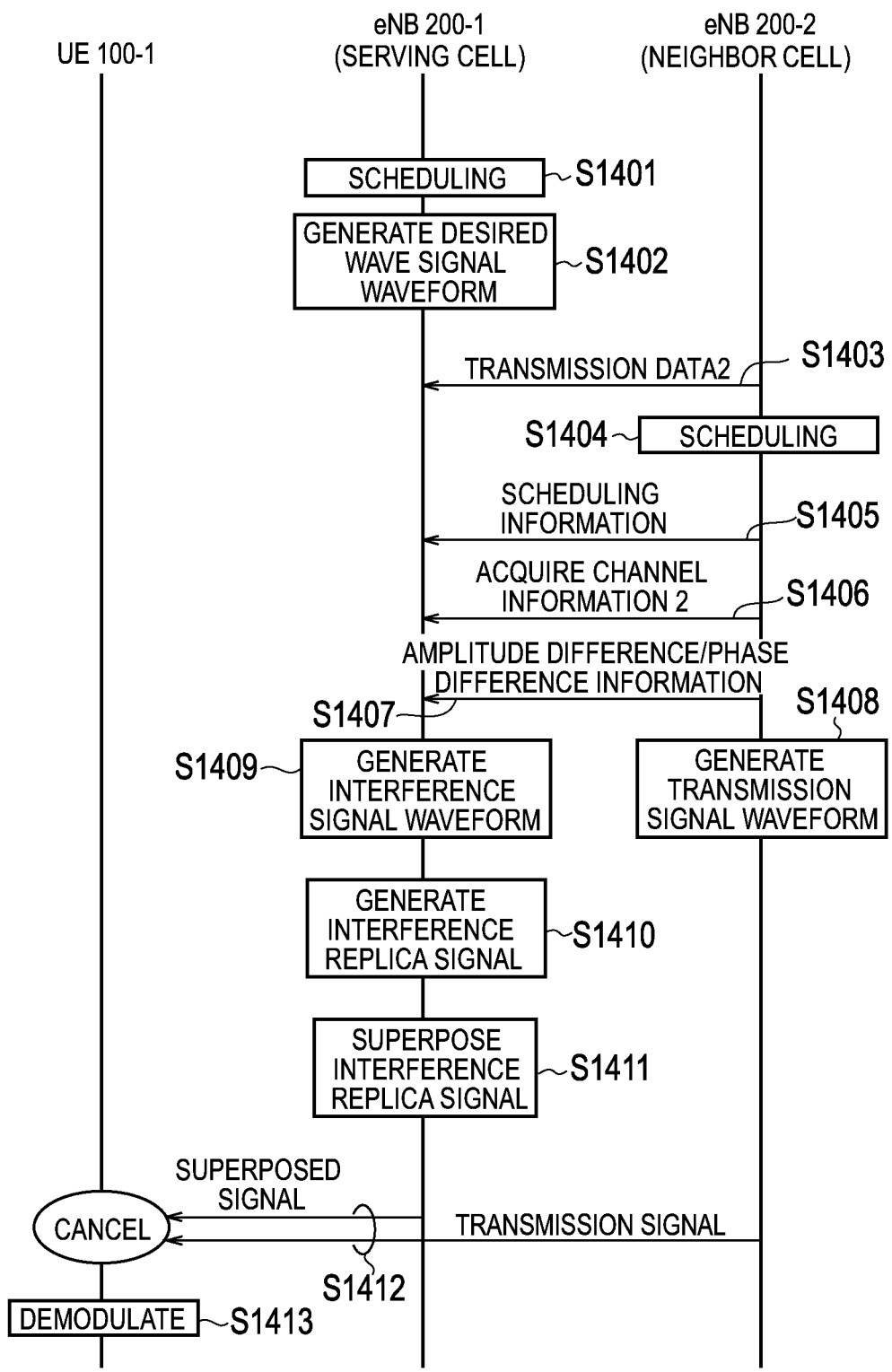
FIG. 15 is a sequence diagram of an operation pattern 4 according to the first embodiment.

FIG. 15 is a sequence diagram of an operation pattern 4 according to the present embodiment. In the operation pattern 4, interference wave information acquired by the eNB 200-1 is transmission data (transmission data 2) for the UE 100-2.

As illustrated in FIG. 15, in step S1401, the eNB 200-1 performs scheduling (or pre-scheduling) for the UE 100-1 that is connected to the cell of the eNB 200-1.

In step S1402, on the basis of a result of the scheduling, the eNB 200-1 generates a transmission signal waveform (a desired wave signal waveform) from transmission data (transmission data 1) for the UE 100-1.

In step S1403, the eNB 200-2 transmits the transmission data 2 to the eNB 200-1.

In addition, similarly to the aforementioned operation pattern 2, data notification may also be performed on the basis of resource information. Specifically, before step S1403, the eNB 200-1 transmits the resource information indicating an assignment resource block for the UE 100-1 to the eNB 200-2, and the eNB 200-2 transmits the transmission data 2 corresponding to the resource information to the eNB 200-2. In this way, it is possible to reduce the amount of a signal transmitted on the X2 interface.

In step S1404, the eNB 200-2 performs scheduling (or pre-scheduling) for the UE 100-2 that is connected to the cell of the eNB 200-2.

In step S1405, on the basis of a result of the scheduling, the eNB 200-2 transmits scheduling information to the eNB 200-1. The scheduling information corresponds to transmission processing information indicating the content of transmission processing when the transmission data 2 is converted into a transmission signal (an interference wave signal).

In step S1406, the eNB 200-1 acquires channel information 2. An operation, in which the eNB 200-1 acquires the channel information 2, is the same as that of the aforementioned operation pattern 1.

In step S1407, the eNB 200-2 transmits, to the eNB 200-1, difference information indicating at least one of an amplitude difference and a phase difference between a reference signal (CRS) and a data signal that are transmitted by the eNB 200-2. The eNB 200-2 may transmit difference information for each resource block to the eNB 200-1.

In addition, the transmission of the difference information from the eNB 200-2 to the eNB 200-1 is not limited to the present operation pattern, and is also applicable to the aforementioned operation patterns and operation patterns to be described later. Furthermore, as described in the aforementioned operation pattern 2, when the assignment resource block for the UE 100-1 is notified from the eNB 200-1 to the eNB 200-2, the eNB 200-2 may also transmit difference information only on the assignment resource block to the eNB 200-1.

In step S1408, on the basis of a result of the scheduling (step S1404), the eNB 200-2 generates a transmission signal waveform (an interference wave signal waveform) from the transmission data 2.

In step S1409, the eNB 200-1 performs transmission processing, which is indicated by the scheduling information (transmission processing information) received from the eNB 200-2, with respect to the transmission data 2 received from the eNB 200-2, thereby generating an interference signal waveform.

In step S1410, on the basis of the channel information 2, the eNB 200-1 generates an opposite characteristic signal of the interference signal waveform as an interference replica signal. At this time, on the basis of the difference information received from the eNB 200-2, the eNB 200-1 adjusts the phase and the amplitude of the interference replica signal.

In step S1411, the eNB 200-1 superposes the interference replica signal on a desired wave signal.

In step S1412, the eNB 200-2 performs transmission to the UE 100-2. The UE 100-1 receives a signal from the eNB 200-2 as an interference wave signal. Meanwhile, the eNB 200-1 transmits a superposition signal to the UE 100-1. The UE 100-1 receives the superposition signal. Furthermore, the interference wave signal is canceled by the interference replica signal included in the superposition signal.

In step S1413, the UE 100-1 demodulates the desired wave signal included in the superposition signal.

(5) Operation Pattern 5

Figure 16:
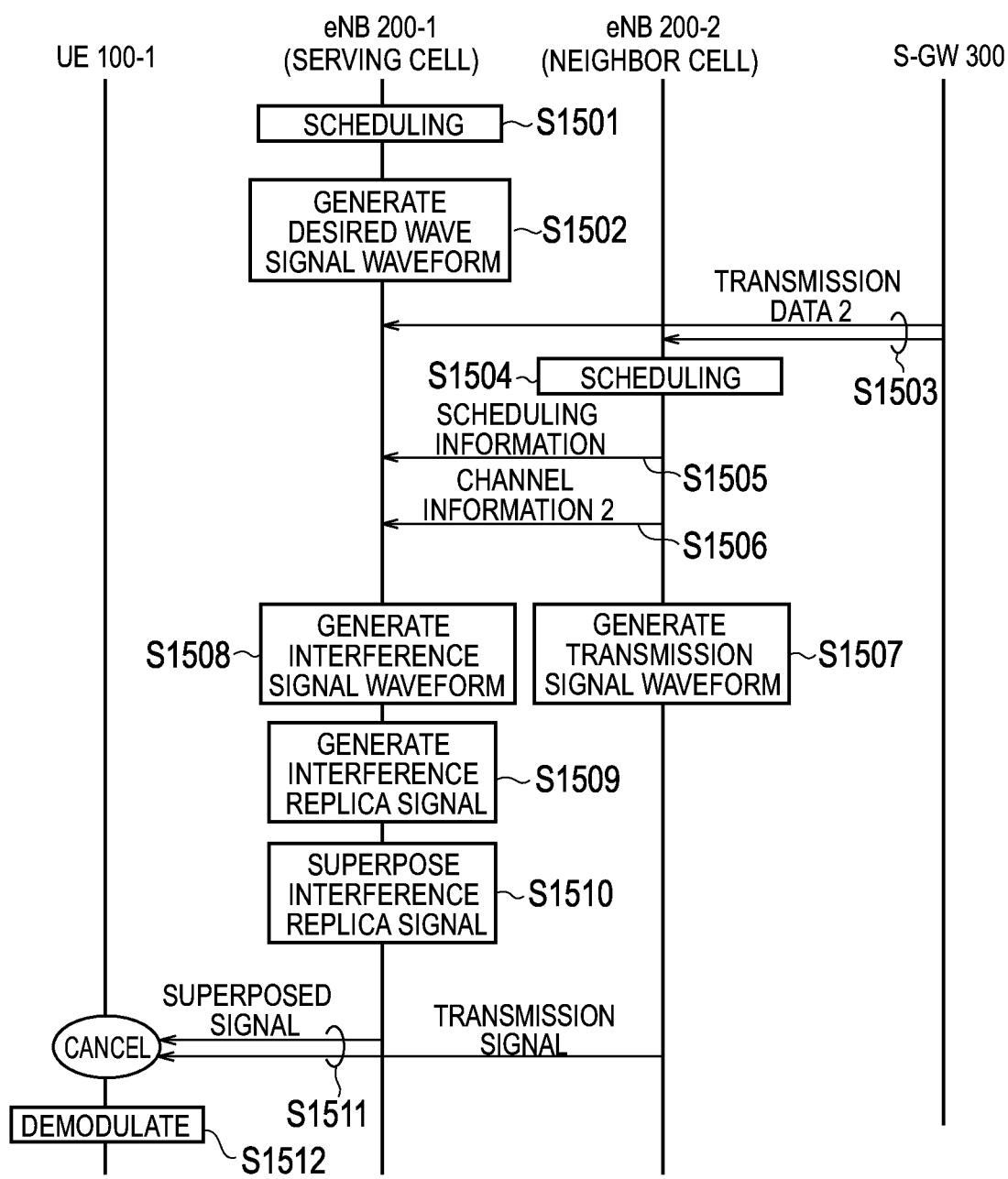
FIG. 16 is a sequence diagram of an operation pattern 5 according to the first embodiment.

FIG. 16 is a sequence diagram of an operation pattern 5 according to the present embodiment. The operation pattern 5 is obtained by changing a part of the operation pattern 4.

As illustrated in FIG. 16, in step S1501, the eNB 200-1 performs scheduling (or pre-scheduling) for the UE 100-1 that is connected to the cell of the eNB 200-1.

In step S1502, on the basis of a result of the scheduling, the eNB 200-1 generates a transmission signal waveform (a desired wave signal waveform) from transmission data (transmission data 1) for the UE 100-1.

In step S1503, the S-GW 300 transmits the transmission data 2 to the eNB 200-1 and the eNB 200-2. In the present operation pattern, the S-GW 300 corresponds to a management device.

In step S1504, the eNB 200-2 performs scheduling (or pre-scheduling) for the UE 100-2 that is connected to the cell of the eNB 200-2.

In step S1505, on the basis of a result of the scheduling, the eNB 200-2 transmits scheduling information to the eNB 200-1. The scheduling information corresponds to transmission processing information indicating the content of transmission processing when the transmission data 2 is converted into a transmission signal (an interference wave signal).

In step S1506, the eNB 200-1 acquires channel information 2. An operation, in which the eNB 200-1 acquires the channel information 2, is the same as that of the aforementioned operation pattern 1.

In step S1507, on the basis of a result of the scheduling (step S1504), the eNB 200-2 generates a transmission signal waveform (an interference wave signal waveform) from the transmission data 2.

In step S1508, the eNB 200-1 performs transmission processing, which is indicated by the scheduling information (transmission processing information) received from the eNB 200-2, with respect to the transmission data 2 received from the eNB 200-2, thereby generating an interference signal waveform.

In step S1509, on the basis of the channel information 2, the eNB 200-1 generates an opposite characteristic signal of the interference signal waveform as an interference replica signal.

In step S1510, the eNB 200-1 superposes the interference replica signal on a desired wave signal.

In step S1511, the eNB 200-2 performs transmission to the UE 100-2. The UE 100-1 receives a signal from the eNB 200-2 as an interference wave signal. Meanwhile, the eNB 200-1 transmits a superposition signal to the UE 100-1. The UE 100-1 receives the superposition signal. Furthermore, the interference wave signal is canceled by the interference replica signal included in the superposition signal.

In step S1512, the UE 100-1 demodulates the desired wave signal included in the superposition signal.

(6) Operation Pattern 6

Figure 17:
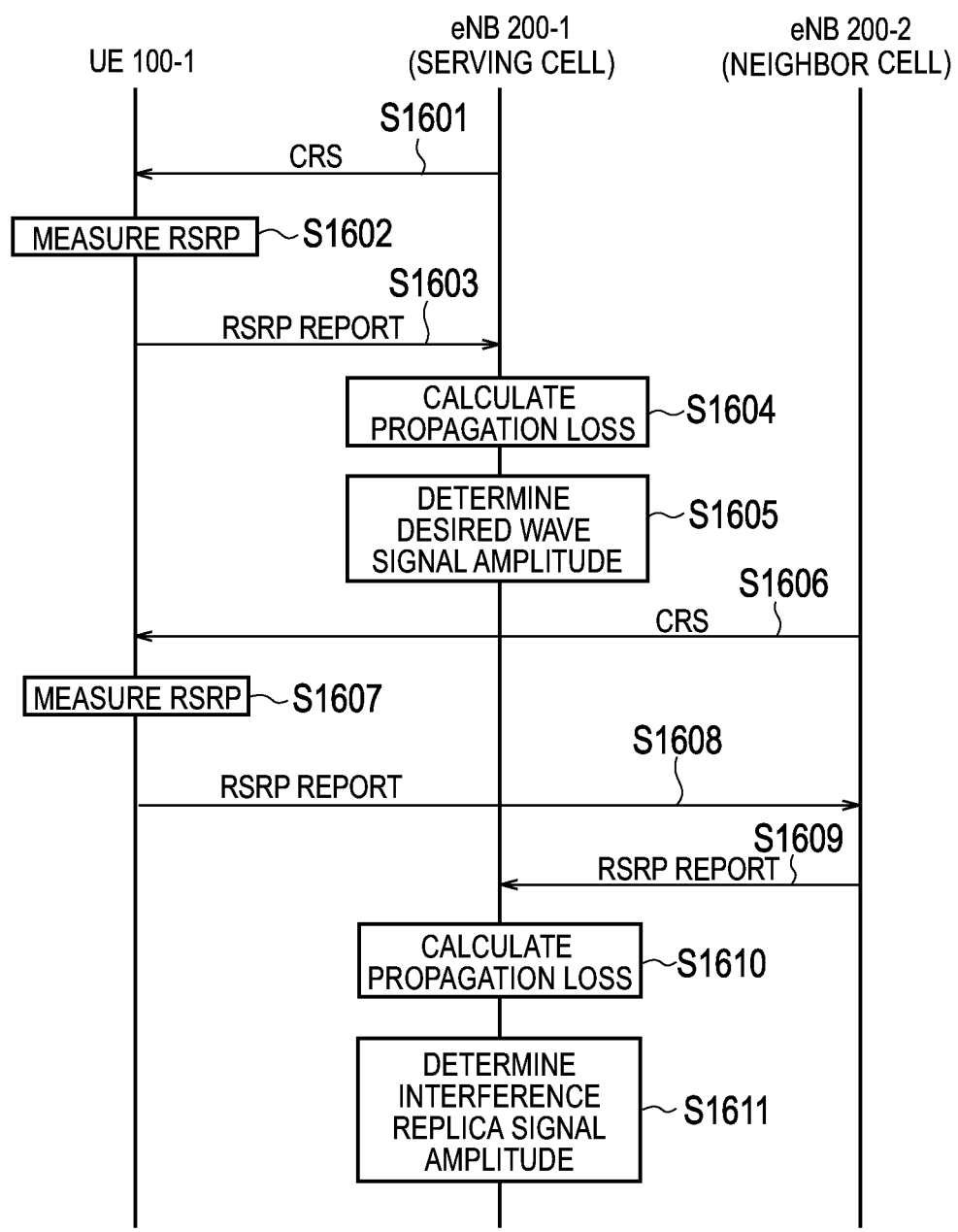
FIG. 17 is a sequence diagram of an operation pattern 6 according to the first embodiment.

FIG. 17 is a sequence diagram of an operation pattern 6 according to the present embodiment. The operation pattern 6 is an operation pattern for appropriately adjusting the amplitude of an interference replica signal. The operation pattern 6 is performed through a combination with any one of the aforementioned operation patterns 1 to 5.

As illustrated in FIG. 17, in step S1601, the eNB 200-1 transmits a reference signal (CRS). The UE 100-1 receives the CRS.

In step S1602, the UE 100-1 measures the received power (RSRP1) of the CRS received from the eNB 200-1.

In step S1603, the UE 100-1 transmits the RSRP1 (RSRP report) to the eNB 200-1.

In step S1604, the eNB 200-1 subtracts the RSRP1 from the transmission power of the CRS, thereby calculating propagation loss (propagation loss 1) between the UE 100-1 and the eNB 200-1.

In step S1605, on the basis of the propagation loss 1, the eNB 200-1 adjusts the amplitude of a desired wave signal.

In step S1606, the eNB 200-2 transmits the CRS. The UE 100-1 receives the CRS.

In step S1607, the UE 100-1 measures the received power (RSRP2) of CRS received from the eNB 200-2.

In step S1608, the UE 100-1 transmits the RSRP2 to the eNB 200-2.

In step S1609, the eNB 200-2 transfers the RSRP2 received from the UE 100-1 to the eNB 200-1. Furthermore, the eNB 200-2 may transfer the RSRP2 to the eNB 200-1 in response to a pre-request from the eNB 200-1.

In addition, the UE 100-1 may not transmit the RSRP2 to the eNB 200-2, but directly transmit the RSRP2 to the eNB 200-1.

In step S1610, the eNB 200-1 subtracts the RSRP2 from the transmission power of the CRS, thereby calculating propagation loss (propagation loss 2) between the UE 100-1 and the eNB 200-2.

In step S1611, on the basis of the propagation loss 2, the eNB 200-1 adjusts the amplitude of an interference replica signal.

In addition, when the eNB 200-1 and/or the eNB 200-2 transmits a reference signal (specifically, CSI-RS) other than the CRS, the UE 100-1 may also measure the received power of the CSI-RS, and may transmit the received power of the CSI-RS to the eNB 200-1 or the eNB 200-2. In this case, information indicating the type (the CRS or the CSI-RS) of the received power may be added.

(7) Operation Pattern 7

Figure 18:
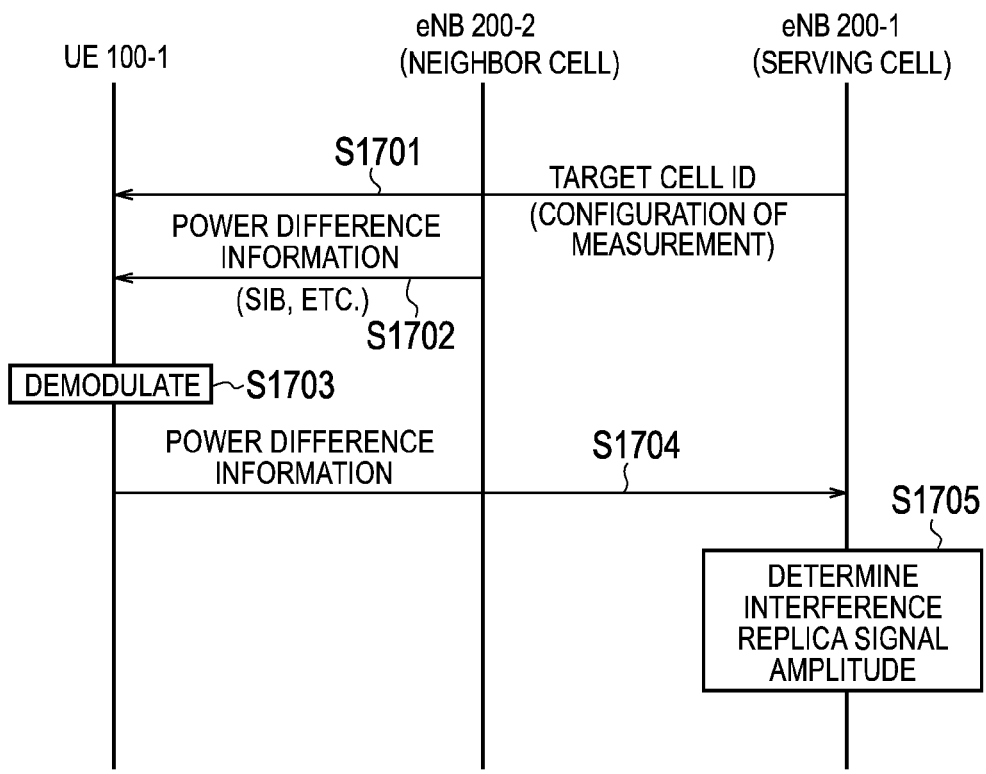
FIG. 18 is a sequence diagram of an operation pattern 7 according to the first embodiment.

FIG. 18 is a sequence diagram of an operation pattern 7 according to the present embodiment. The operation pattern 7 is an operation pattern for appropriately adjusting the amplitude of an interference replica signal. The operation pattern 7 is performed through a combination with any one of the aforementioned operation patterns 1 to 5.

As illustrated in FIG. 18, in step S1701, the eNB 200-1 transmits an identifier (a cell ID) of a neighbor cell (a cell managed by the eNB 200-2) to the UE 100-1.

In step S1702, on the basis of the cell ID received from the eNB 200-1, the UE 100-1 receives system information (SIB; System Information Block) that is transmitted by the eNB 200-2. In the present operation pattern, the SIB includes power difference information indicating a power difference (a transmission power difference) between a reference signal and a data signal that is transmitted by the eNB 200-2.

In step S1703, the UE 100-1 demodulates the SIB to acquire the power difference information included in the SIB.

In step S1704, the UE 100-1 transmits the power difference information to the eNB 200-1.

In step S1705, on the basis of the power difference information received from the UE 100-1, the eNB 200-1 adjusts the amplitude of an interference replica signal.

In addition, in the present operation pattern, the power difference information is transmitted from the eNB 200-2 to the eNB 200-1 via the UE 100-1. However, the power difference information may be directly transmitted from the eNB 200-2 to the eNB 200-1. In this case, the eNB 200-2 may also transmit the power difference information to the eNB 200-1 in response to a request from the eNB 200-1.

(8) Operation Pattern 8

Figure 19:
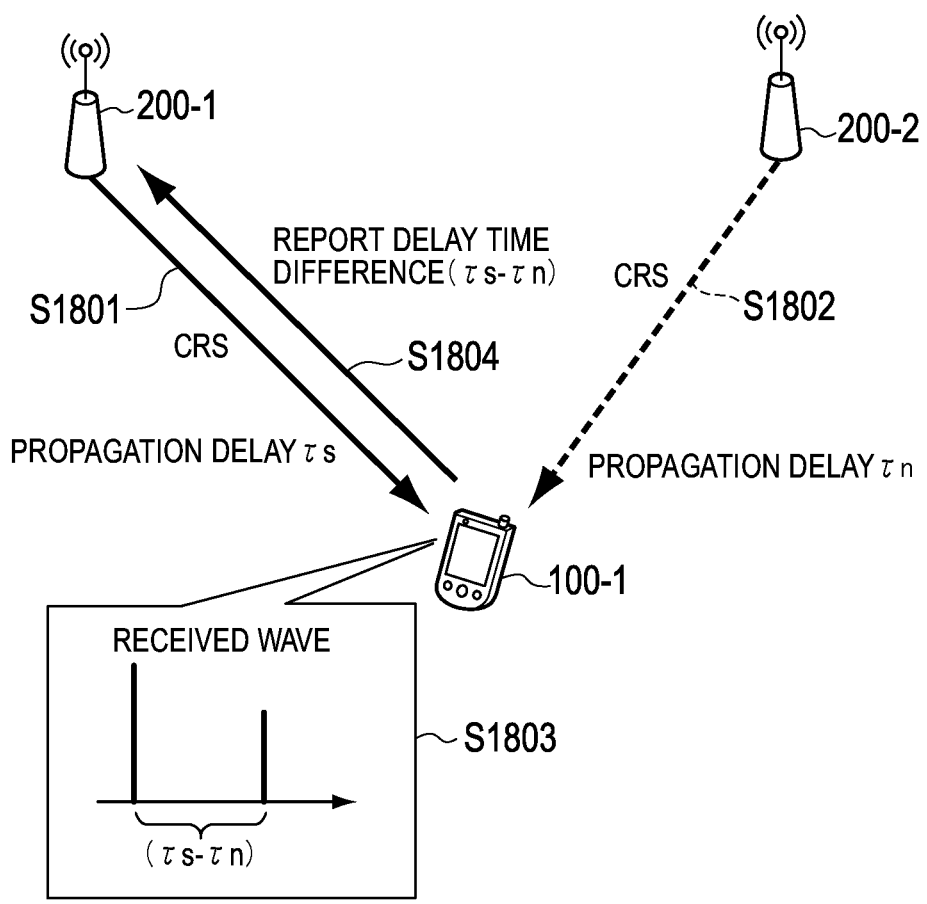
FIG. 19 is a sequence diagram of an operation pattern 8 according to the first embodiment.

FIG. 19 is a sequence diagram of an operation pattern 8 according to the present embodiment. The operation pattern 8 is an operation pattern for appropriately adjusting the transmission timing (the superposition timing) of an interference replica signal. The operation pattern 8 is performed through a combination with any one of the aforementioned operation patterns 1 to 5.

As illustrated in FIG. 19, in step S1801, the eNB 200-1 transmits a reference signal (CRS). The CRS transmitted by the eNB 200-1 is received in the UE 100-1 after propagation delay TS.

In step S1802, the eNB 200-2 transmits CRS simultaneously with the transmission of the CRS by the eNB 200-1. The CRS transmitted by the eNB 200-2 is received in the UE 100-1 after propagation delay in.

In step S1803, the UE 100-1 generates a difference between the reception timing of the CRS from the eNB 200-1 and the reception timing of the CRS from the eNB 200-2 as time difference information. That is, the time difference information is information indicating a delay time difference between the delay time TS from the eNB 200-1 to the UE 100-1 and the delay time in from the eNB 200-2 to the UE 100-1.

In step S1804, the UE 100-1 transmits the time difference information to the eNB 200-1. On the basis of the time difference information received from the UE 100-1, the eNB 200-1 adjusts the transmission timing (the superposition timing) of an interference replica signal.

In addition, in the present operation pattern, the eNB 200-1 and the eNB 200-2 simultaneously transmit the CRS. However, when the transmission timings of the CRS are different from each other, it is sufficient if transmission timing difference information is shared by the eNB 200-1 and the eNB 200-2 and the time difference information received from the UE 100-1 is corrected. Alternatively, when the UE 100-1 side knows the transmission timing difference information (a difference between subframe numbers, a difference between symbol numbers, and the like), the UE 100-1 may correct the information and report a delay time difference.

Furthermore, in the present operation pattern, the CRS is used as the reference signal. However, instead of the CRS, CSI-RS may be used. Moreover, the UE 100-1 may also transmit information indicating a difference between the received power of the CRS from the eNB 200-1 and the received power of the CRS from the eNB 200-2, together with the time difference information.

Second Embodiment

Hereinafter, a second embodiment will be described while focusing on differences from the aforementioned first embodiment.

In the above-described first embodiment, it is assumed that the coordinated interference cancellation scheme (a scheme in which an interference replica signal is superposed on the desired wave signal) is applied all the time.

However, in the second embodiment, only when a predetermined condition is satisfied, the coordinated interference cancellation scheme is applied.

(1) Operation Pattern 1

Figure 20:
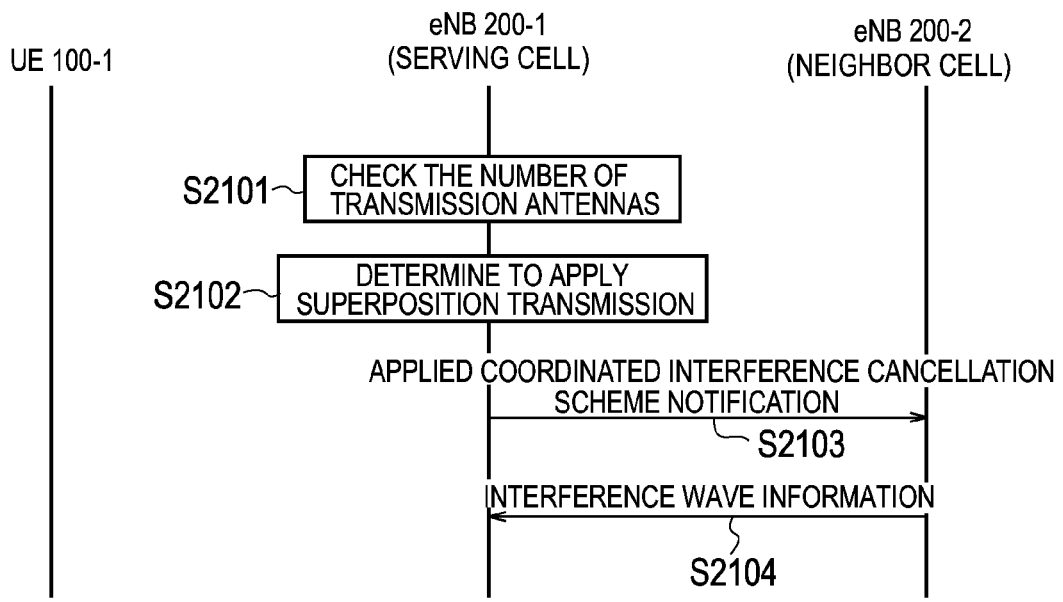
FIG. 20 is a sequence diagram of an operation pattern 1 according to the second embodiment.

FIG. 20 is a sequence diagram of an operation pattern 1 according to the present embodiment. In the present operation pattern, the eNB 200-1 determines whether or not to apply the coordinated interference cancellation scheme on the basis of the number of antennas (transmission antennas) associated with the serving cell. Herein, when the number of cells managed by the eNB 200-1 is one, the number of antennas associated with the serving cell means the number of antennas of the eNB 200-1. When the number of cells managed by the eNB 200-1 is plural and the antenna differs depending on each cell, the number of antennas associated with the serving cell means the number of antennas of the serving cell.

As shown in FIG. 20, in step S2101, the eNB 200-1 checks the number of antennas associated with the serving cell.

In step S2102, the eNB 200-1 determines whether or not to apply the coordinated interference cancellation scheme on the basis of the number of antennas associated with the serving cell. For example, when the number of antennas associated with the serving cell is one, the application of the CB-CoMP is disabled, and thus, the eNB 200-1 determines to apply the coordinated interference cancellation scheme. Alternatively, the eNB 200-1 may determine to apply the coordinated interference cancellation scheme even when the number of antennas associated with the serving cell is plural if the number is insufficient for the beam forming/null steering. The following description proceeds with the assumption that it is determined to apply the coordinated interference cancellation scheme.

In step S2103, the eNB 200-1 transmits, to the eNB 200-2, a notification indicating that the coordinated interference cancellation scheme is applied.

In step S2104, the eNB 200-2 transmits interference wave information to the eNB 200-1 in response to the notification from the eNB 200-1.

(2) Operation Pattern 2

Figure 21:
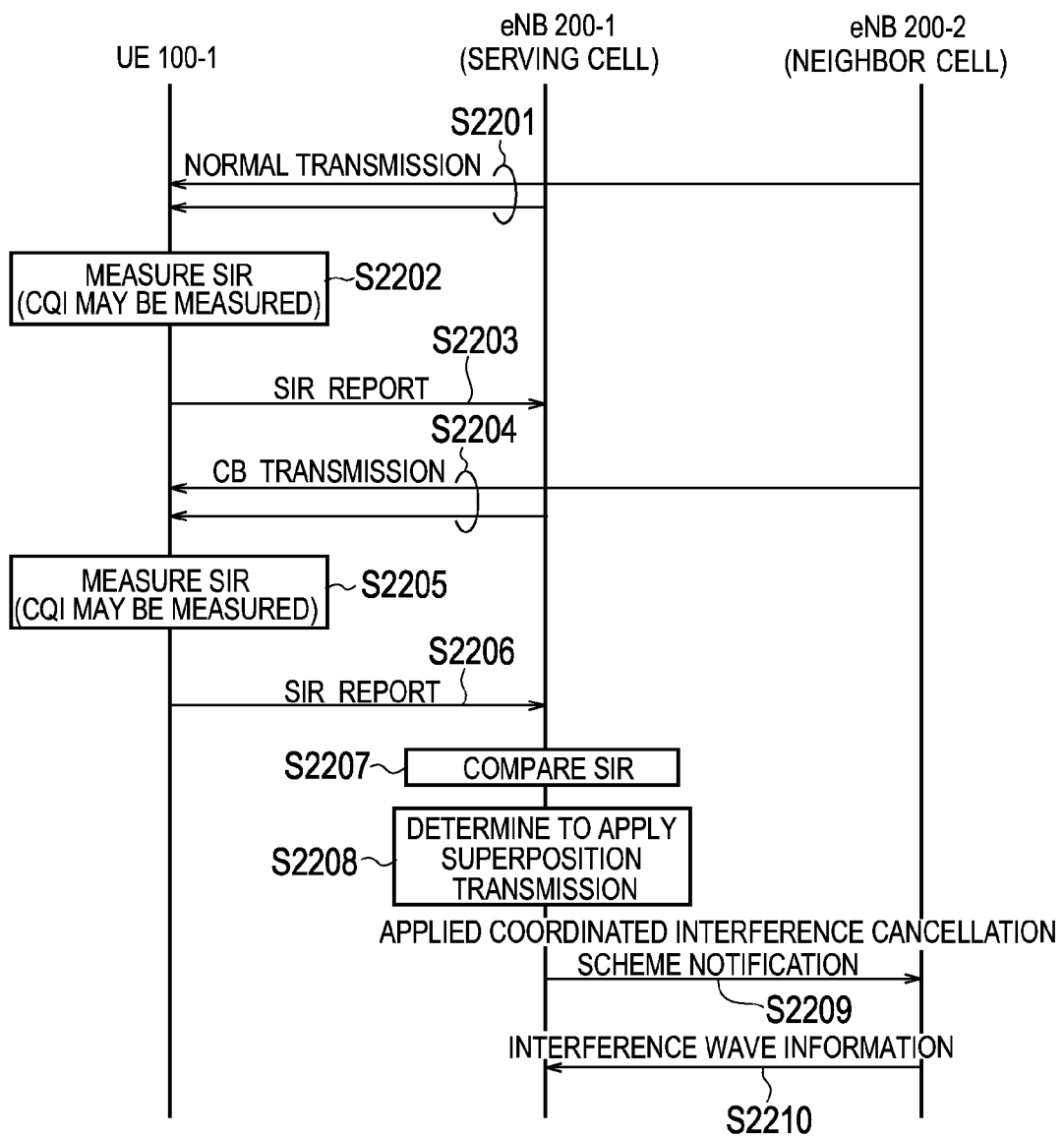
FIG. 21 is a sequence diagram of an operation pattern 2 according to the second embodiment.

FIG. 21 is a sequence diagram of an operation pattern 2 according to the present embodiment. In the present operation pattern, on the basis of the received signal state in the UE 100-1, the eNB 200-1 determines whether or not to apply the coordinated interference cancellation scheme. The eNB 200-1 determines to apply the coordinated interference cancellation scheme when the received signal state (received SIR, etc.) is not improved even when the CB-CoMP is implemented, for example.

As shown in FIG. 21, in step S2201, the eNB 200-1 and the eNB 200-2 perform a normal transmission.

In step S2202, the UE 100-1 measures the received SIR. However, in addition to the received SIR, another reception quality index such as CQI may be used.

In step S2203, the UE 100-1 transmits the received SIR (SIR report) to the eNB 200-1.

In step S2204, the eNB 200-1 and the eNB 200-2 perform transmission by the CB-CoMP.

In step S2205, the UE 100-1 measures the received SIR. However, in addition to the received SIR, another reception quality index such as CQI may be used.

In step S2206, the UE 100-1 transmits the received SIR (SIR report) to the eNB 200-1.

In step S2207, the eNB 200-1 compares the received SIR before the CB-CoMP and the received SIR during the CB-CoMP.

In step S2208, the eNB 200-1 determines whether or not the received SIR during the CB-CoMP is improved by at least a constant amount (including zero) than the received SIR before the CB-CoMP. It is noted that the constant amount may be shared between the eNB 200-1 and the eNB 200-2.

When the received SIR during the CB-CoMP is improved than the received SIR before the CB-CoMP, the eNB 200-1 determines to continue the CB-CoMP. On the other hand, when the received SIR during the CB-CoMP is not improved than the received SIR before the CB-CoMP, the eNB 200-1 determines to apply the coordinated interference cancellation scheme. The following description proceeds with the assumption that it is determined to apply the coordinated interference cancellation scheme.

In step S2209, the eNB 200-1 transmits, to the eNB 200-2, a notification indicating that the coordinated interference cancellation scheme is applied.

In step S2210, the eNB 200-2 transmits interference wave information to the eNB 200-1 in response to the notification from the eNB 200-1.

(3) Operation Pattern 3

Figure 22:
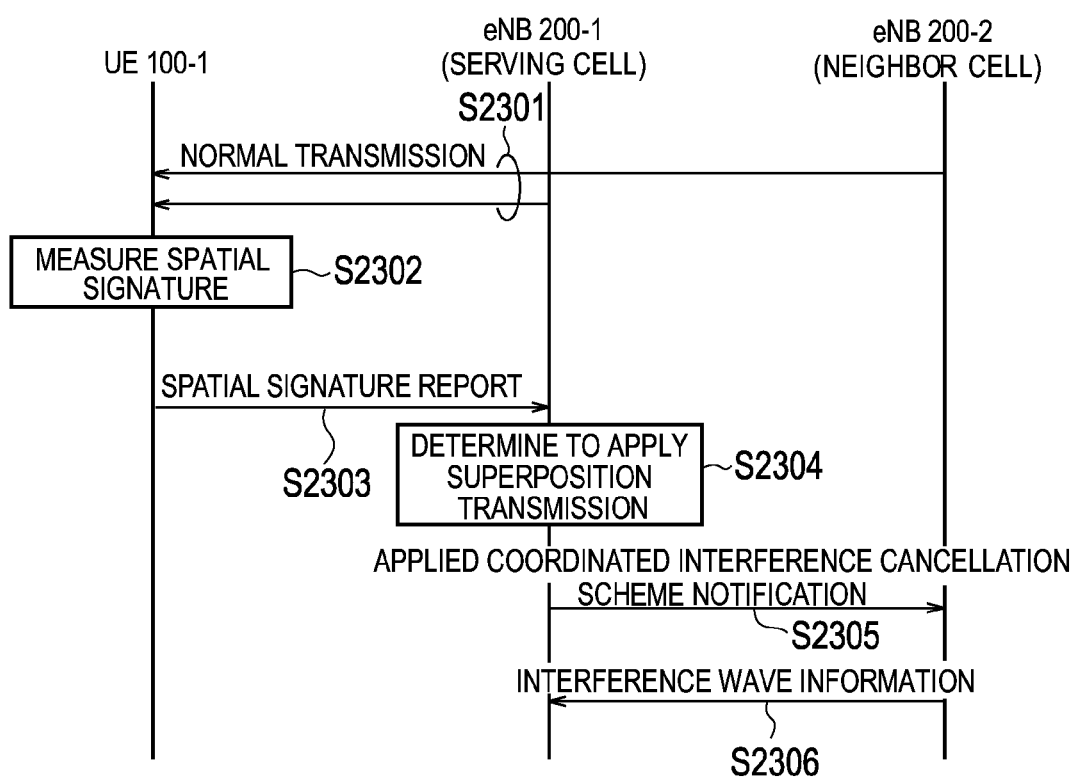
FIG. 22 is a sequence diagram of an operation pattern 3 according to the second embodiment.

FIG. 22 is a sequence diagram of an operation pattern 3 according to the present embodiment. The present operation pattern shares in common with the above-described operation pattern 2 in that whether or not to apply the coordinated interference cancellation scheme is determined on the basis of the received signal state. However, in the present operation pattern, the eNB 200-1 determines whether or not to apply the coordinated interference cancellation scheme on the basis of a spatial characteristic (Spatial Signature) as the received signal state.

As shown in FIG. 22, in step S2301, the eNB 200-1 and the eNB 200-2 perform a normal transmission.

In step S2302, the UE 100-1 measures spatial characteristic indicating a spatial correlation among antennas (spatial separation level) in the eNB 200-2.

In step S2303, the UE 100-1 transmits the spatial characteristic (the Spatial Signature) to the eNB 200-1.

In step S2304, on the basis of the spatial characteristic, the eNB 200-1 determines whether or not to apply the coordinated interference cancellation scheme. The eNB 200-1 considers that it is not possible to apply the CB-CoMP when it is determined that the null steering is difficult from the spatial correlation (separation level) among antennas in the eNB 200-2, for example, and determines to apply the coordinated interference cancellation scheme. The following description proceeds with the assumption that it is determined to apply the coordinated interference cancellation scheme.

In step S2305, the eNB 200-1 transmits, to the eNB 200-2, a notification indicating that the coordinated interference cancellation scheme is applied.

In step S2306, the eNB 200-2 transmits the interference wave information to the eNB 200-1 in response to the notification from the eNB 200-1.

It is noted that in the present operation pattern, the spatial characteristic is measured in the UE 100-1; however, in a case of TDD, the spatial characteristic may be measured in the eNB 200-2. In this case, step S2305 may be omitted, and the notification in step S2305 may be included in step S2306.

(4) Operation Pattern 4

Figure 23:
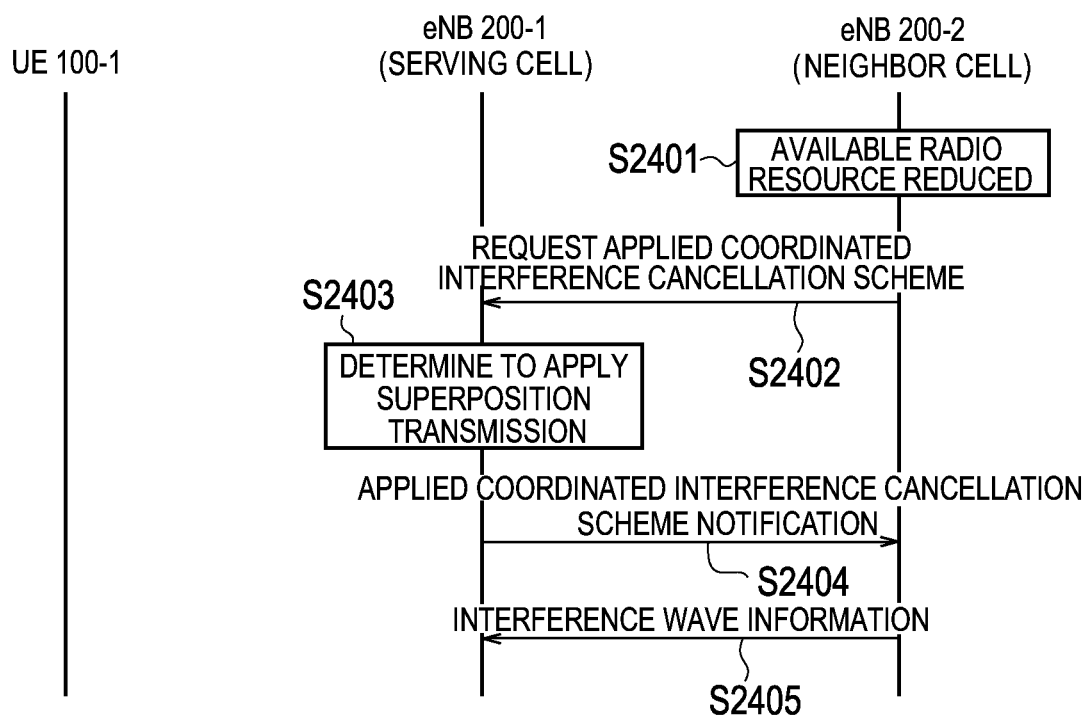
FIG. 23 is a sequence diagram of an operation pattern 4 according to the second embodiment.

FIG. 23 is a sequence diagram of an operation pattern 4 according to the present embodiment. In the present operation pattern, on the basis of a status of a radio resource, the eNB 200-1 determines whether or not to apply the coordinated interference cancellation scheme. Further, in the present operation pattern, in an initial state, the eNB 200-1 and the eNB 200-2 implement JT-CoMP or DPS-CoMP.

As shown in FIG. 23, in step S2401, the eNB 200-2 checks an available radio resource in the cell of the eNB 200-2 so as to determine whether or not a capacity of the available radio resource is reduced. The following description proceeds with the assumption that it is determined that the capacity of the available radio resource is reduced.

In step S2402, the eNB 200-2 transmits, to the eNB 200-1, a request indicating that the coordinated interference cancellation scheme is applied.

In step S2403, the eNB 200-1 determines to apply the coordinated interference cancellation scheme in response to the request from the eNB 200-2.

In step S2404, the eNB 200-1 transmits, to the eNB 200-2, a notification indicating that the coordinated interference cancellation scheme is applied.

In step S2405, the eNB 200-2 transmits the interference wave information to the eNB 200-1 in response to the notification from the eNB 200-1.

It is noted that in the present operation pattern, whether or not to apply the coordinated interference cancellation scheme is determined on the basis of the available radio resource of the eNB 200-2; however, the following determination may also be adopted. Specifically, the eNB 200-1 or the eNB 200-2 may apply the coordinated interference cancellation scheme in order to avoid the interference when the radio resource assigned to the UE located near a cell end exceeds a predetermined amount.

(5) Operation Pattern 5

Figure 24:
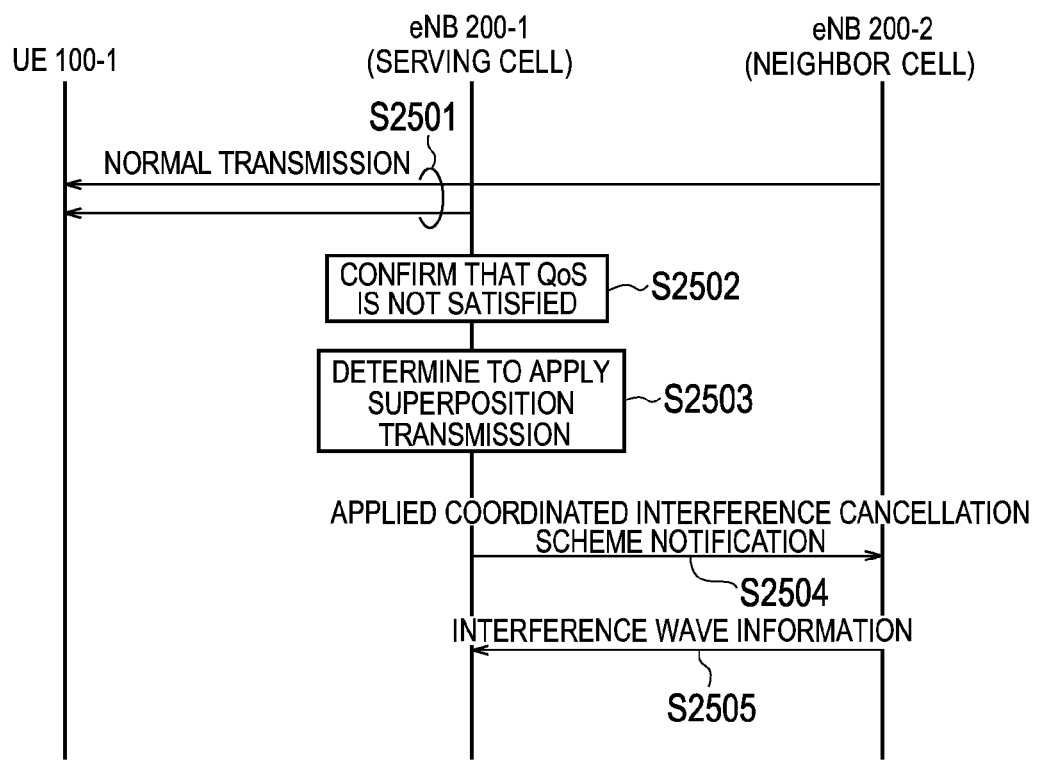
FIG. 24 is a sequence diagram of an operation pattern 5 according to the second embodiment.

FIG. 24 is a sequence diagram of an operation pattern 5 according to the present embodiment. In the present operation pattern, on the basis of the QoS required by the UE 100-1, the eNB 200-1 determines whether or not to apply the coordinated interference cancellation scheme.

As shown in FIG. 24, in step S2501, the eNB 200-1 and the eNB 200-2 perform a normal transmission. However, in the present operation pattern, the eNB 200-1 and the eNB 200-2 may implement the CB-CoMP.

In step S2502, the eNB 200-1 checks whether or not the QoS required by the UE 100-1 is satisfied. Herein, the QoS required by the UE 100-1 can be discriminated by the type of a bearer.

In step S2503, on the basis of the QoS required by the UE 100-1, the eNB 200-1 determines whether or not to apply the coordinated interference cancellation scheme. The eNB 200-1 determines to apply the coordinated interference cancellation scheme when the QoS required by the UE 100-1 is not satisfied, for example. The following description proceeds with the assumption that it is determined to apply the coordinated interference cancellation scheme.

In step S2504, the eNB 200-1 transmits, to the eNB 200-2, a notification indicating that the coordinated interference cancellation scheme is applied.

In step S2505, the eNB 200-2 transmits the interference wave information to the eNB 200-1 in response to the notification from the eNB 200-1.

Other Embodiments

Thus, the present invention has been described with the embodiments. However, it should not be understood that those descriptions and drawings constituting a part of this disclosure limit the present invention. From this disclosure, a variety of alternate embodiments, examples, and applicable techniques will become apparent to one skilled in the art.

In each of the aforementioned embodiments, the eNB 200-1 generates the OFDM signal from the desired wave signal superposed with the interference replica signal, and transmits the generating OFDM signal; however, this is not limiting. For example, the eNB 200-1 may generate a signal such as a CDMA signal, an IDMA signal, a FDMA signal and a TDMA signal, and transmit the generating signal.

In each of the aforementioned embodiments, the serving cell and the neighbor cell are managed by different eNBs (the eNB 200-1 and the eNB 200-2). However, the serving cell and the neighbor cell may be managed by the same eNB (the eNB 200-1). Further, the eNB 200-1 may apply the present invention in a case where the UE 200-1 and the UE 200-2 are located in the same serving cell. Thus, the eNB 200-1 may manage each of communication with the UE 100-1 and communication with the UE 200-2. For example, the eNB 200-1 may apply the present invention in a case the eNB 200-1 performs MU (Multi User)-MIMO (Multiple Input Multiple Output) in which a plurality of UEs 100 (the UE 100-1 and the UE 100-2) are spatially multiplexed by a downlink multi-antenna transmission. In these case, the eNB 200-1 can use the information used for generating the interference replica signal (such as the transmission data 2 and the interference wave signal waveform) without receiving the information form the neighbor eNB because the eNB 200-1 controlling transmission to the UE 100-2.

Each of the aforementioned embodiments has described an example in which the present invention is applied to the LTE system. However, the present invention may also be applied to systems, other than the LTE system, as well as the LTE system.

In addition, the entire content of U.S. Provisional Application No. 61/740,989 (filed on Dec. 21, 2012), U.S. Provisional Application No. 61/745,016 (filed on Dec. 21, 2012), U.S. Provisional Application No. 61/745,043 (filed on Dec. 21, 2012), and U.S. Provisional Application No. 61/748,293 (filed on Jan. 2, 2013) is incorporated in the present specification by reference.

INDUSTRIAL APPLICABILITY

As described above, the mobile communication system, the communication control method, the base station, the user terminal and the processor according to the present invention are able to reduce received power of the interference wave signal in the user terminal, and thus are useful for a mobile communication field.

The invention claimed is:

1. A mobile communication system comprising:
a user terminal that receives a desired wave signal from a serving cell and an interference wave signal that is a signal to another user terminal;
a first base station that manages the serving cell;
a second base station that manages a neighbor cell adjacent to the serving cell; and
a management device that manages the first base station and the second base station, wherein
the first base station includes:
a controller that generates an interference replica signal corresponding to the interference wave signal and superposes the interference replica signal on the desired wave signal;
a transmitter that transmits the desired wave signal superposed with the interference replica signal to the user terminal; and
a receiver that receives information used for generating the interference replica signal from at least one of the second base station, the management device, and the user terminal, wherein
the controller generates the interference replica signal such that the interference replica signal received by the user terminal cancels the interference wave signal received by the user terminal,
the controller generates the interference replica signal on the basis of the information received by the receiver,
the information used for generating the interference replica signal includes waveform information relating to a signal waveform of the interference wave signal,
the second base station transmits the waveform information to the first base station, and
the receiver receives the waveform information.

2. The mobile communication system according to claim 1, wherein
the another user terminal is connected to the neighbor cell, and
the interference wave signal is a signal from the neighbor cell.

3. The mobile communication system according to claim 1, wherein
the controller generates the interference replica signal such that a phase of the interference replica signal received by the user terminal is opposite to a phase of the interference wave signal received by the user terminal.

4. The mobile communication system according to claim 1, wherein
the controller generates the interference replica signal such that an amplitude of the interference replica signal received by the user terminal is equal to an amplitude of the interference wave signal received by the user terminal.

5. The mobile communication system according to claim 1, wherein
the first base station includes at least one antenna associated with the serving cell, and
the controller determines whether or not to apply superposition transmission in which the interference replica signal is superposed on the desired wave signal, on the basis of a number of the at least one antenna.

6. The mobile communication system according to claim 1, wherein
the controller determines whether or not to apply superposition transmission in which the interference replica signal is superposed on the desired wave signal, on the basis of a received signal state in the user terminal.

7. The mobile communication system according to claim 1, wherein
the controller determines whether or not to apply superposition transmission in which the interference replica signal is superposed on the desired wave signal, on the basis of a usage status of a radio resource in the mobile communication system.

8. The mobile communication system according to claim 1, wherein
the controller determines whether or not to apply superposition transmission in which the interference replica signal is superposed on the desired wave signal, on the basis of Quality of Service (QoS) required by the user terminal.

9. The mobile communication system according to claim 1, wherein the controller transmits resource information indicating a radio resource used for transmitting the desired wave signal, to the second base station, and
the second base station transmits the waveform information to the first base station, on the basis of the resource information.

10. The mobile communication system according to claim 1, wherein
the information used for generating the interference replica signal includes transmission data obtained before being converted into the interference wave signal in the second base station,
the second base station transmits the transmission data to the first base station, and
the receiver receives the transmission data from the second base station.

11. The mobile communication system according to claim 10, wherein
the information used for generating the interference replica signal further includes transmission process information indicating a content of a transmission process used when the transmission data is converted into the interference wave signal in the second base station,
the second base station further transmits the transmission process information to the first base station, and
the receiver further receives the transmission process information from the second base station.

12. The mobile communication system according to claim 1, wherein
the information used for generating the interference replica signal includes transmission data obtained before being converted into the interference wave signal in the second base station,
the management device transmits the transmission data to the first base station, and
the receiver receives the transmission data from the management device.

13. The mobile communication system according to claim 12, wherein
the information used for generating the interference replica signal further includes transmission process information indicating a content of a transmission process used when the transmission data is converted into the interference wave signal in the second base station,
the second base station transmits the transmission process information to the first base station, and
the receiver receives the transmission process information from the second base station.

14. The mobile communication system according to claim 1, wherein
the interference wave signal includes a data signal transmitted on a physical downlink shared channel,
the information used for generating the interference replica signal is difference information indicating at least one of an amplitude difference and a phase difference between the data signal and a reference signal transmitted by the second base station,
the second base station transmits the difference information to the first base station, and
the receiver receives the difference information from the second base station.

15. The mobile communication system according to claim 1, wherein
the information used for generating the interference replica signal is received power information indicating received power about a reference signal received by the user terminal from the second base station,
the user terminal transmits the received power information to the second base station,
the second base station transfers the received power information to the first base station, and
the receiver receives the received power information from the second base station.

16. The mobile communication system according to claim 1, wherein
the information used for generating the interference replica signal is received power information indicating received power about a reference signal received by the user terminal from the second base station,
the user terminal transmits the received power information to the first base station, and
the receiver receives the received power information from the user terminal.

17. The mobile communication system according to claim 1, wherein
the interference wave signal includes a data signal transmitted on a physical downlink shared channel,
the information used for generating the interference replica signal is power difference information indicating a power difference between the data signal and a reference signal transmitted by the second base station,
the user terminal transmits the power difference information to the first base station, and
the receiver receives the power difference information from the user terminal.

18. The mobile communication system according to claim 1, wherein
the interference wave signal includes a data signal transmitted on a physical downlink shared channel,
the information used for generating the interference replica signal is power difference information indicating a power difference between the data signal and a reference signal transmitted by the second base station,
the second base station transmits the power difference information to the first base station, and
the receiver receives the power difference information from the second base station.

19. The mobile communication system according to claim 1, wherein
the information used for generating the interference replica signal is time difference information indicating a delay time difference between a delay time from the first base station to the user terminal and a delay time from the second base station to the user terminal,
the user terminal transmits the time difference information to the first base station, and
the receiver receives the time difference information from the user terminal.

20. The mobile communication system according to claim 1, wherein
the information used for generating the interference replica signal is channel information indicating a channel characteristic between the second base station and the user terminal,
the receiver receives the channel information from at least one of the second base station and the user terminal, and
the controller generates the interference replica signal on the basis of the channel information received by the receiver.

21. The mobile communication system according to claim 20, wherein
the user terminal generates the channel information on the basis of a reference signal received from the second base station and transmits the generated channel information to the first base station, and
the receiver receives the channel information from the user terminal.

22. The mobile communication system according to claim 20, wherein
the user terminal generates the channel information on the basis of a reference signal received from the second base station and transmits the generated channel information to the second base station,
the second base station transfers, to the first base station, the channel information from the user terminal, and
the receiver receives the channel information from the second base station.

23. The mobile communication system according to claim 21, wherein
the first base station transmits, to the user terminal, cell designation information indicating a cell for which a channel characteristic should be estimated, and
the user terminal estimates the channel characteristic about the cell indicated by the cell designation information to thereby generate the channel information.

24. The mobile communication system according to claim 20, wherein
the second base station generates the channel information on the basis of a reference signal received from the user terminal and transmits the generated channel information to the first base station, and
the receiver receives the channel information from the second base station.

25. The mobile communication system according to claim 24, wherein
the first base station transmits, to the second base station, terminal designation information indicating a user terminal for which a channel characteristic should be estimated, and
the second base station estimates the channel characteristic about the user terminal indicated by the terminal designation information to thereby generate the channel information.

26. The mobile communication system according to claim 24, wherein
the first base station transmits, to the second base station, demodulation-use information for demodulating the reference signal transmitted by the user terminal, and
the second base station demodulates the reference signal by using the demodulation-use information to thereby generate the channel information.

27. A communication control method used in a mobile communication system comprising a user terminal that receives a desired wave signal from a serving cell and an interference wave signal that is a signal to another user terminal and a first base station that manages the serving cell; a second base station that manages a neighbor cell to which the another user terminal is connected and which is adjacent to the serving cell; and a management device that manages the first base station and the second base station, the communication control method comprising the steps of:
by the first base station,
receiving information used for generating the interference replica signal from at least one of the second base station, the management device, and the user terminal;
generating, on the basis of the information received, an interference replica signal corresponding to the interference wave signal;
superposing the interference replica signal on the desired wave signal; and
transmitting the desired wave signal superposed with the interference replica signal to the user terminal, wherein
the interference replica signal is generated such that the interference replica signal received by the user terminal cancels the interference wave signal received by the user terminal.

28. The communication control method according to claim 27, wherein
the information used for generating the interference replica signal is channel information indicating a channel characteristic between the second base station and the user terminal.

29. A base station, which manages a serving cell in a mobile communication system including a user terminal that receives a desired wave signal from the serving cell and an interference wave signal that is a signal to another user terminal, comprising:
a controller that generates an interference replica signal corresponding to the interference wave signal and to superpose the interference replica signal on the desired wave signal;
a transmitter that transmits, to the user terminal, the desired wave signal superposed with the interference replica signal; and
a receiver that receives information used for generating the interference replica signal from at least one of another base station that manages a neighbor cell to which the another user terminal is connected and which is adjacent to the serving cell, a management device that manages the base station and the another base station, and the user terminal, wherein
the controller generates the interference replica signal such that the interference replica signal received by the user terminal cancels the interference wave signal received by the user terminal, and
the controller generates the interference replica signal on the basis of the information received by the receiver.

30. The base station according to claim 29, wherein
the information used for generating the interference replica signal is channel information indicating a channel characteristic between the another base station and the user terminal.

31. A base station, which manages a neighbor cell in a mobile communication system including a user terminal that receives a desired wave signal from a serving cell and an interference wave signal from the neighbor cell adjacent to the serving cell, wherein:
- another base station that manages the serving cell transmits an interference replica signal corresponding to the interference wave signal by superposing the interference replica signal on the desired wave signal,
- the base station includes a transmitter communicatively coupled to a memory, the transmitter transmitting to the another base station, information used for generating the interference replica signal,
- the information used for generating the interference replica signal includes waveform information relating to a signal waveform of the interference wave signal, and
- the interference replica signal is generated by the another base station such that the interference replica signal received by the user terminal cancels the interference wave signal received by the user terminal.

32. The base station according to claim 31, wherein the information used for generating the interference replica signal is channel information indicating a channel characteristic between the base station and the user terminal.

33. A user terminal that receives a desired wave signal from a serving cell and an interference wave signal that is a signal to another user terminal,
the user terminal comprising:
- a transmitter communicatively coupled to a memory, the transmitter transmitting, to a first base station that manages the serving cell, information used for generating an interference replica signal, wherein
- the information used for generating the interference replica signal is received power information indicating received power about a reference signal received by the user terminal from a second base station, and
- the first base station transmits the interference replica signal corresponding to the interference wave signal by superposing the interference replica signal on the desired wave signal.

34. The user terminal according to claim 33, wherein
the information used for generating the interference replica signal is channel information indicating a channel characteristic between the user terminal and a second base station that manages a neighbor cell to which the another user terminal is connected and which is adjacent to the serving cell.

35. A processor communicatively coupled to a memory and provided in a base station that manages a serving cell in a mobile communication system including a user terminal that receives a desired wave signal from the serving cell and an interference wave signal that is a signal to another user terminal, wherein the processor executes:
- a generation process of generating an interference replica signal corresponding to the interference wave signal;
- a superposition process of superposing the interference replica signal on the desired wave signal;
- a transmission process of transmitting the desired wave signal superposed with the interference replica signal to the user terminal; and
- a reception process of receiving information used for generating the interference replica signal from at least one of another base station that manages the neighbor cell to which the another user terminal is connected and which is adjacent to the serving cell, a management device that manages the base station and the another base station, and the user terminal, wherein in the generation process, the interference replica signal is generated on the basis of the received information, and
in the generation process, the interference replica signal is generated such that the interference replica signal received by the user terminal cancels the interference wave signal received by the user terminal.

36. The processor according to claim 35, wherein the processor further executes:
- a reception process of receiving information used for generating the interference replica signal from at least one of another base station that manages the neighbor cell to which the another user terminal is connected and which is adjacent to the serving cell, a management device that manages the base station and the another base station, and the user terminal, wherein
- in the generation process, the interference replica signal is generated on the basis of the received information.

37. The processor according to claim 36, wherein
the information used for generating the interference replica signal is channel information indicating a channel characteristic between the another base station and the user terminal.

38. A processor communicatively coupled to a memory and provided in a base station that manages a neighbor cell in a mobile communication system including a user terminal that receives a desired wave signal from a serving cell and an interference wave signal from the neighbor cell adjacent to the serving cell, wherein:
- another base station that manages the serving cell transmits an interference replica signal corresponding to the interference wave signal by superposing the interference replica signal on the desired wave signal,
- the processor performs a process of transmitting, to the another base station, the information used for generating the interference replica signal,
- the information used for generating the interference replica signal includes waveform information relating to a signal waveform of the interference wave signal, and
- the interference replica signal is generated by the another base station such that the interference replica signal received by the user terminal cancels the interference wave signal received by the user terminal.

39. The processor according to claim 38, wherein
the information used for generating the interference replica signal is channel information indicating a channel characteristic between the base station and the user terminal.

40. A processor communicatively coupled to a memory and provided in a user terminal that receives a desired wave signal from a serving cell and an interference wave signal that is a signal to another user terminal, wherein:
- a first base station that manages the serving cell transmits an interference replica signal corresponding to the interference wave signal by superposing the interference replica signal on the desired wave signal,
- the processor performs a process of transmitting, to the first base station, the information used for generating the interference replica signal, and
- the information used for generating the interference replica signal is received power information indicating received powers about a reference signal received by the user terminal from a second base station.

41. The processor according to claim 40, wherein
the information used for generating the interference replica signal is channel information indicating a channel characteristic between the user terminal and a second base station that manages a neighbor cell to which the another user terminal is connected and which is adjacent to the serving cell.

* * * * *